June 16, 1942. F. R. ZIMMERMAN ET AL 2,286,326
SPRING CONSTRUCTION ASSEMBLING MACHINE
Filed July 1, 1940 12 Sheets-Sheet 1

Inventors:
Fred R. Zimmerman, and
Rudolph Wm. Lotz,

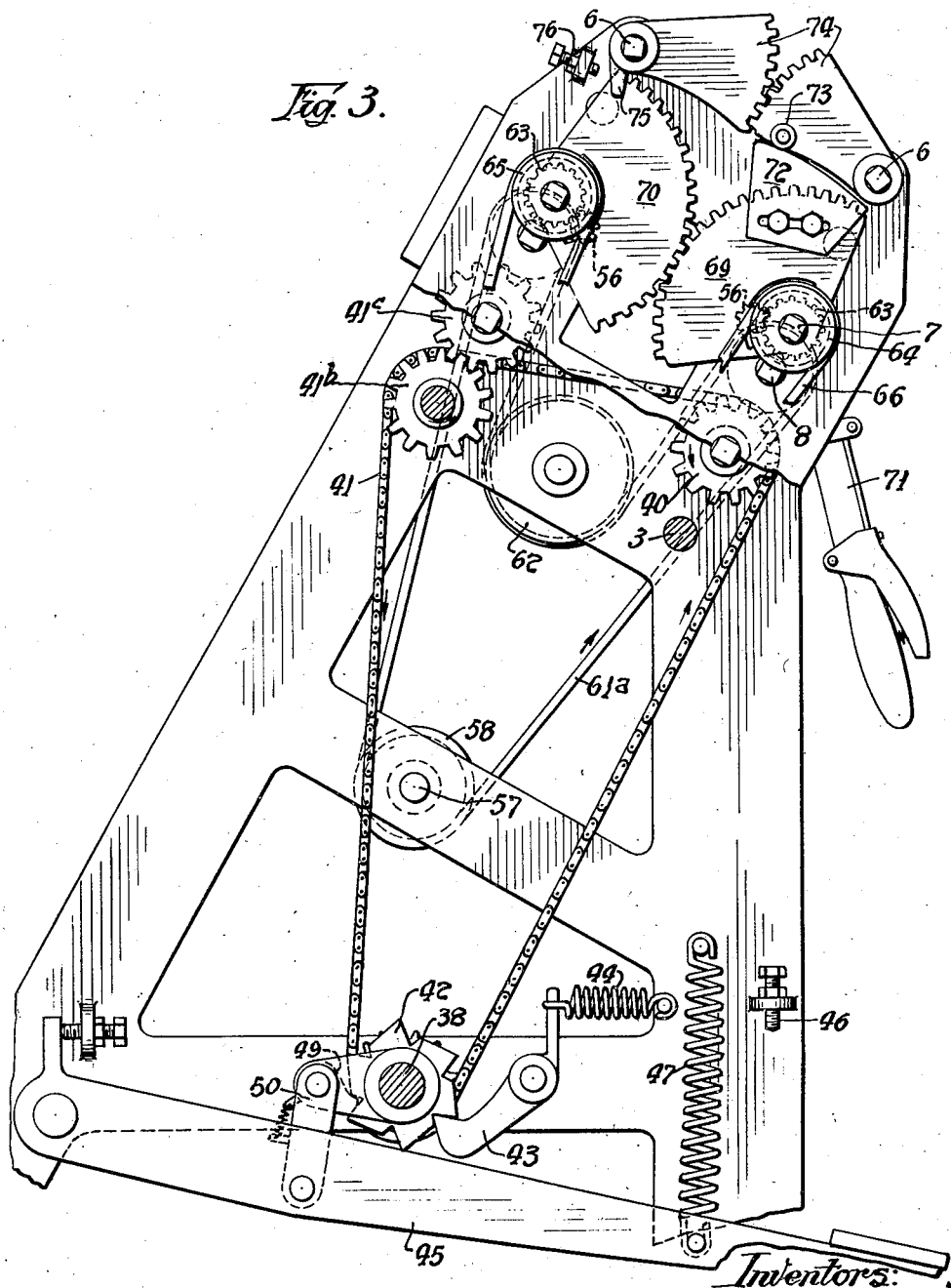

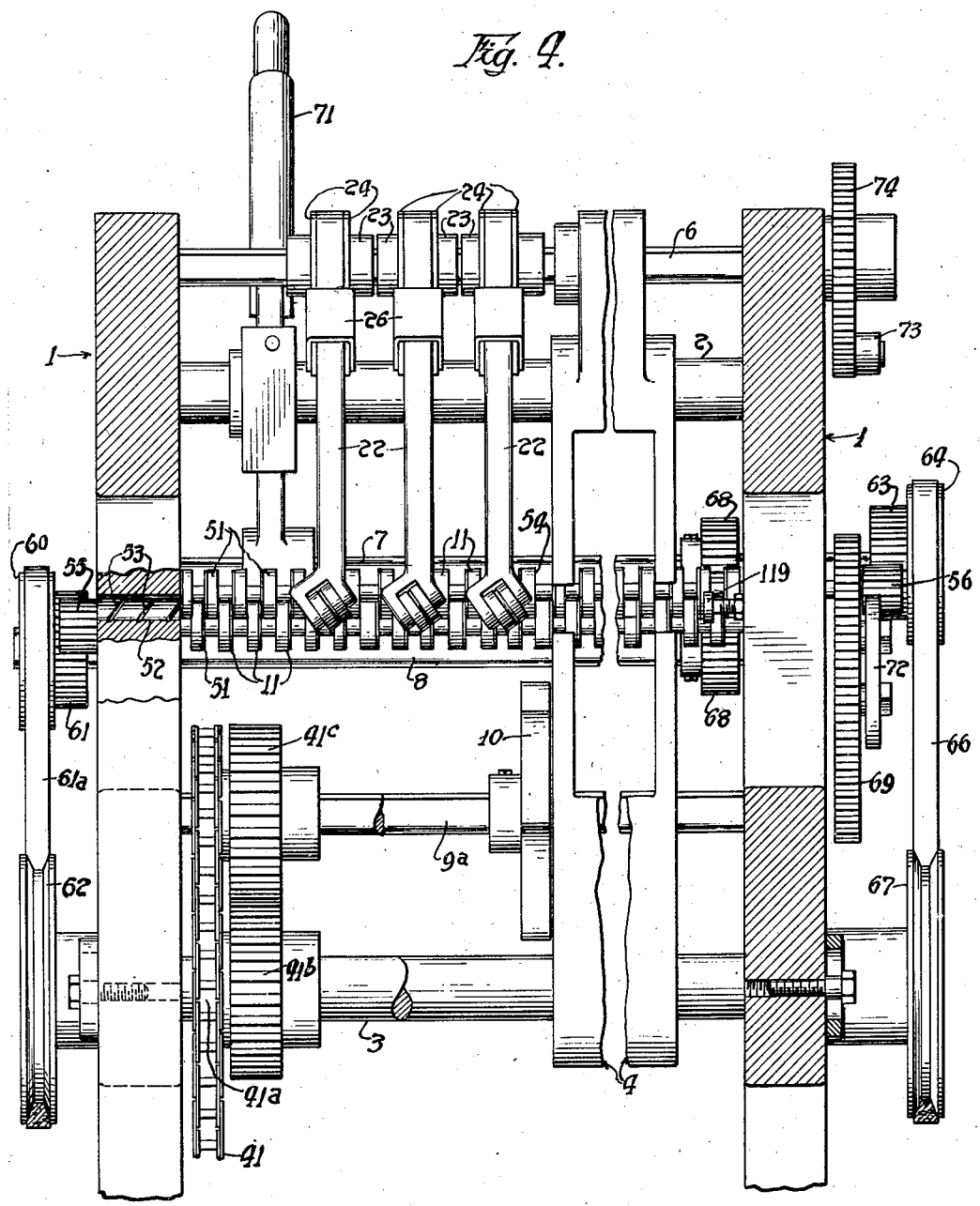

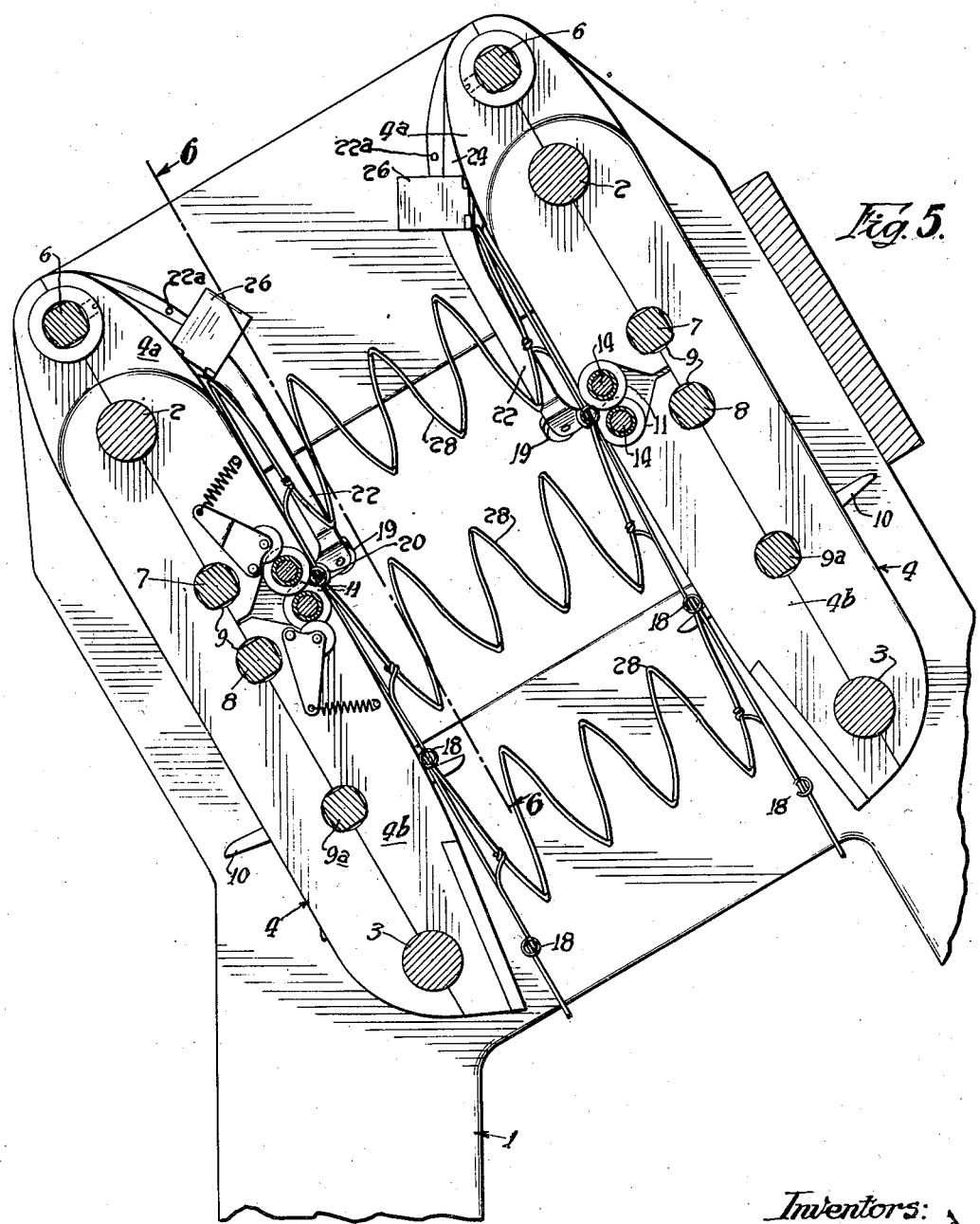

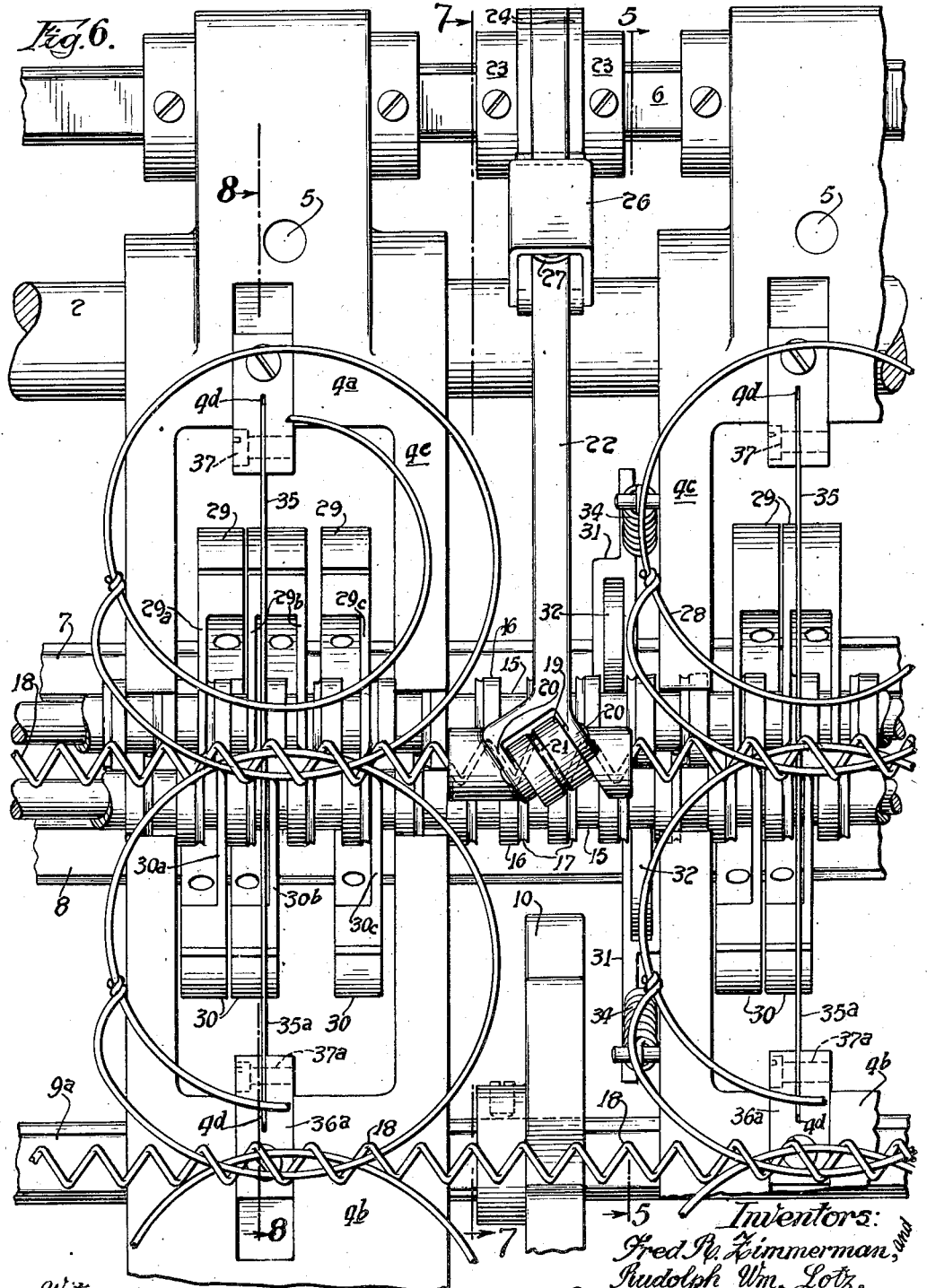

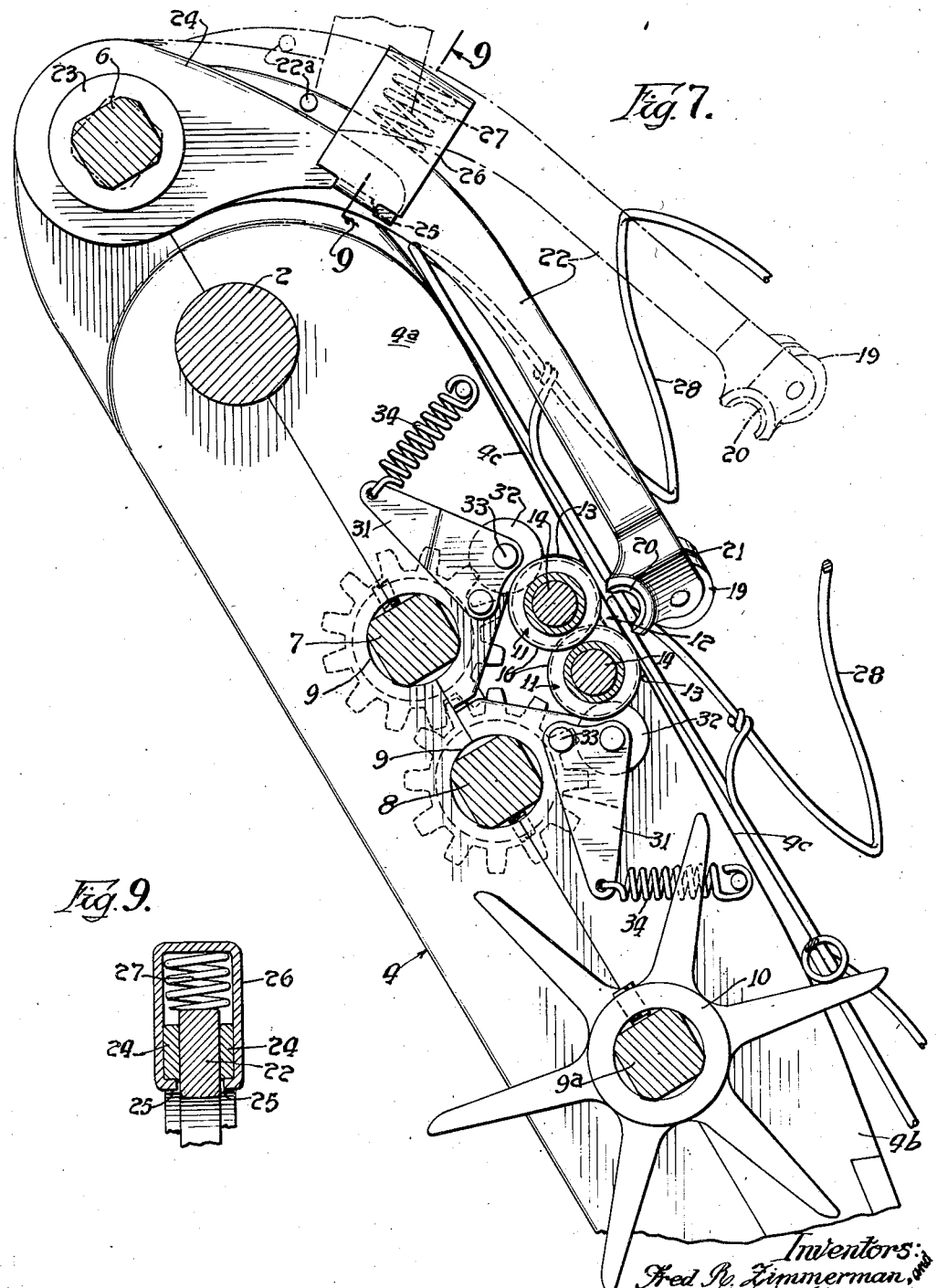

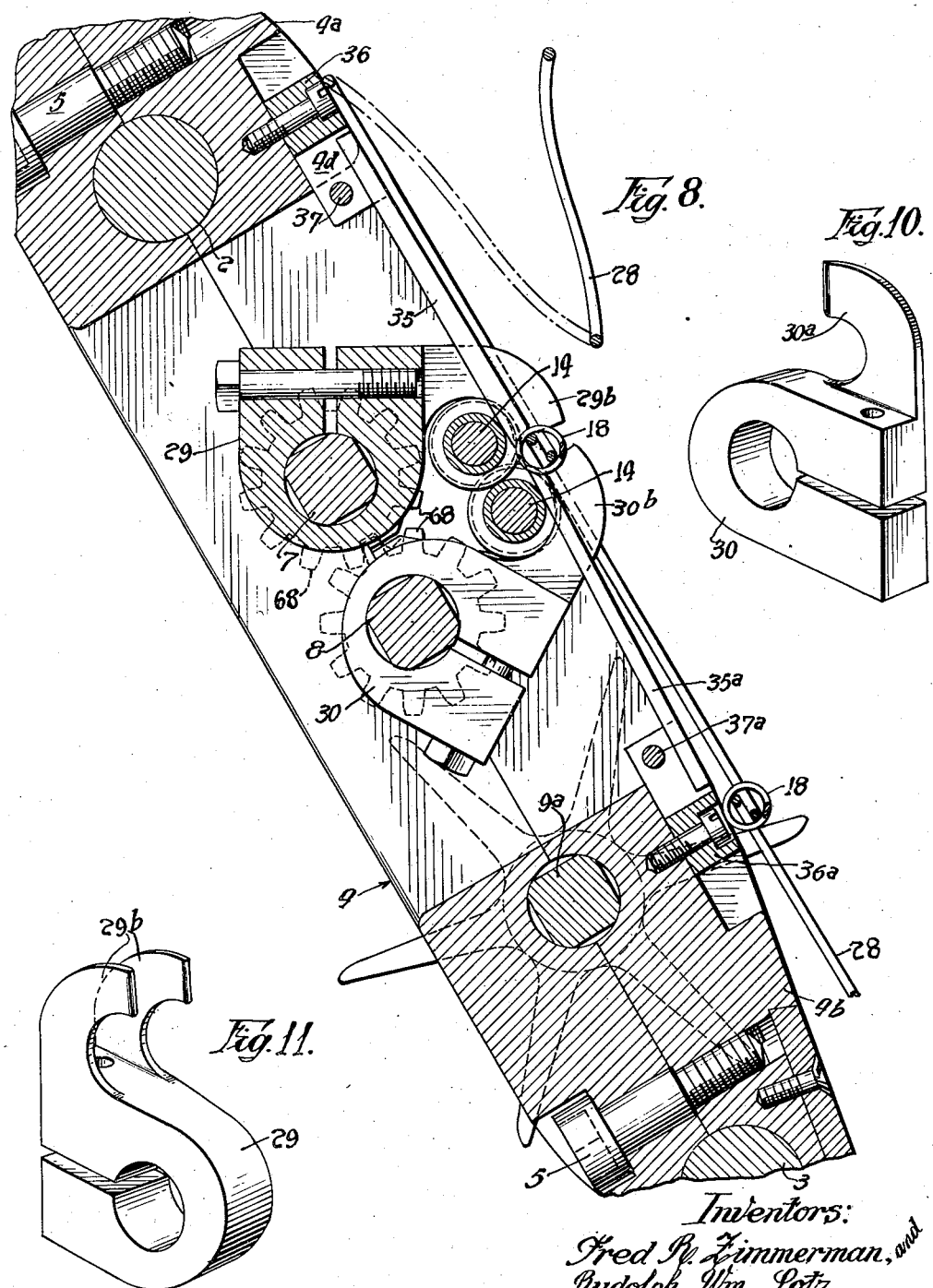

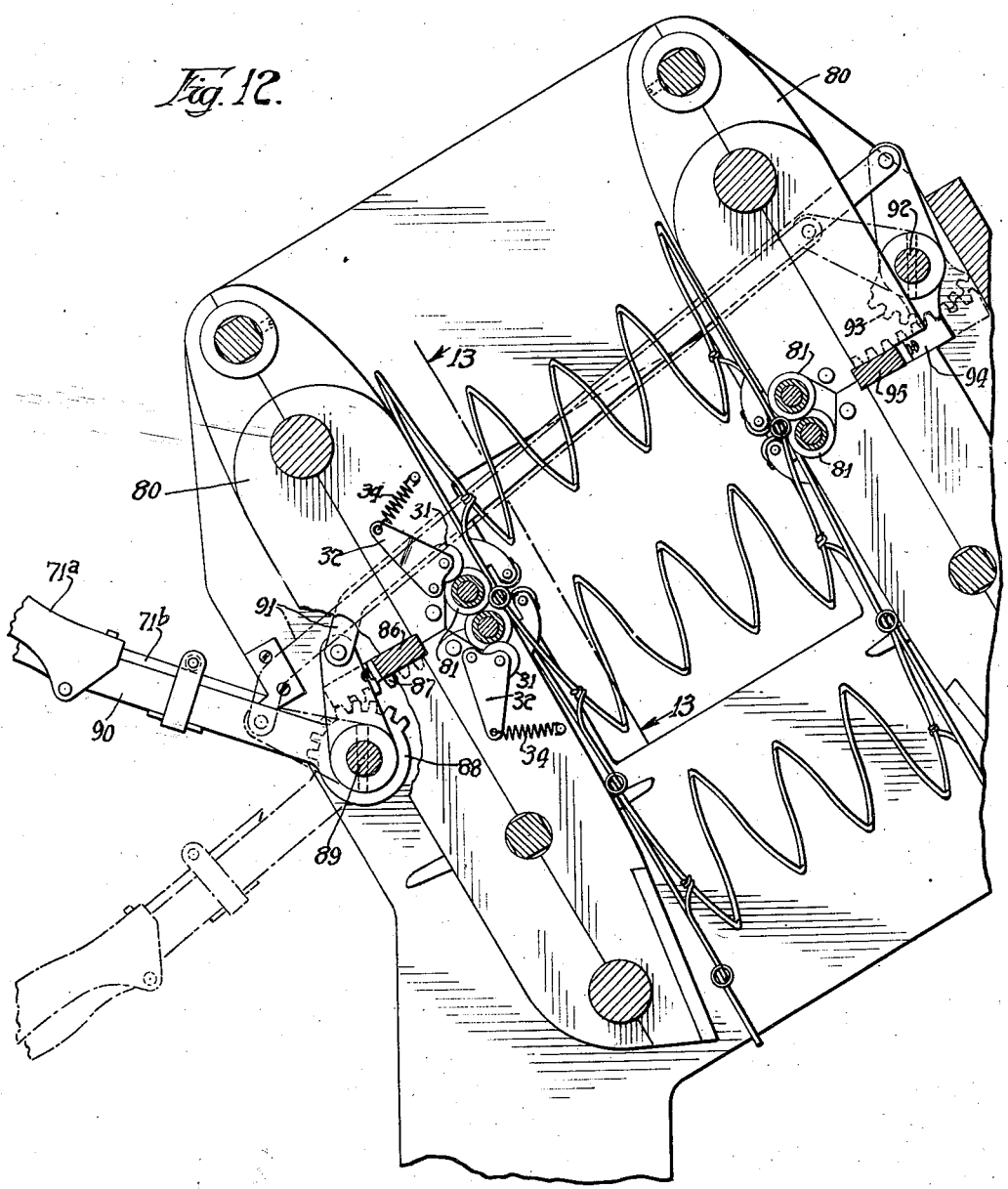

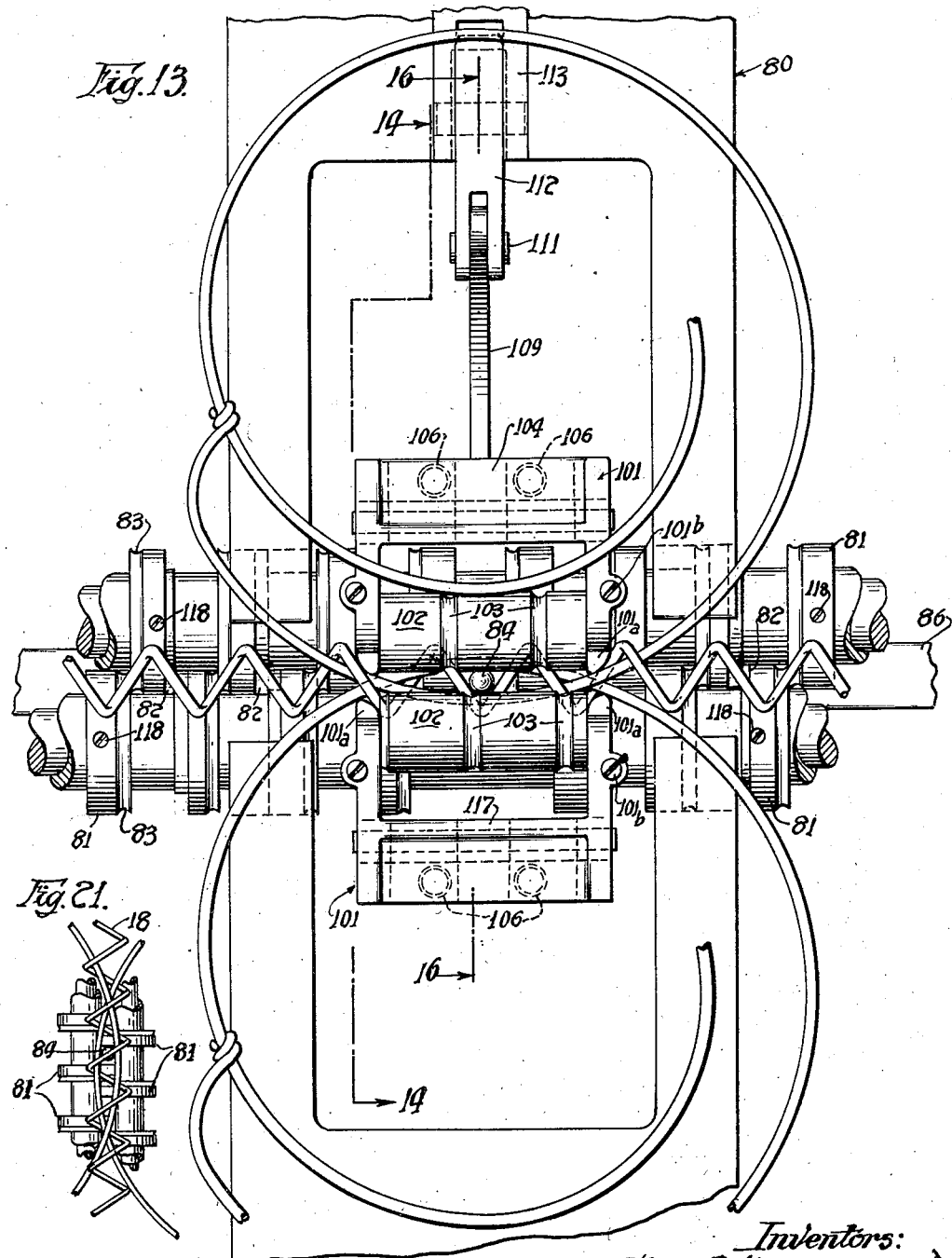

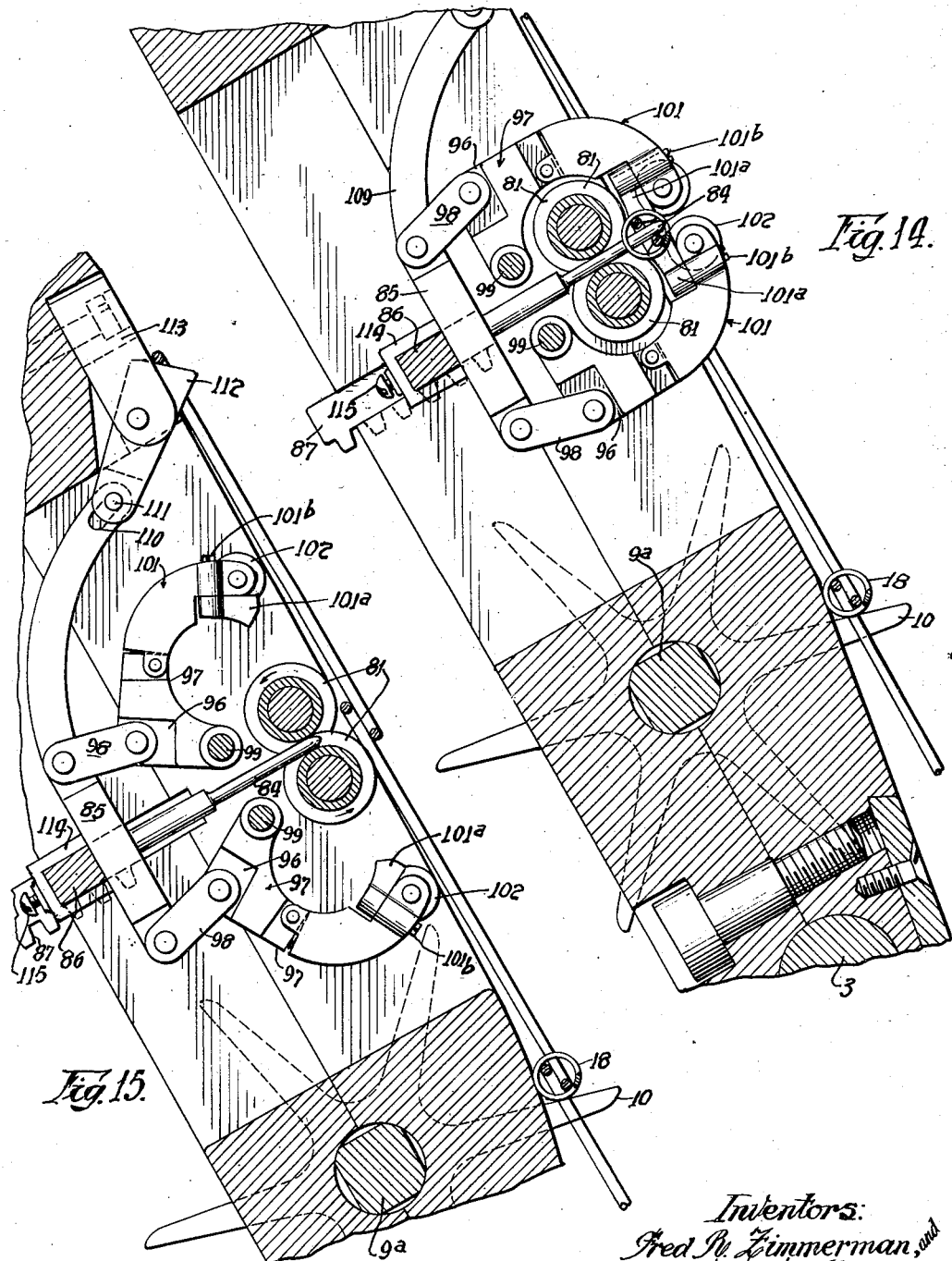

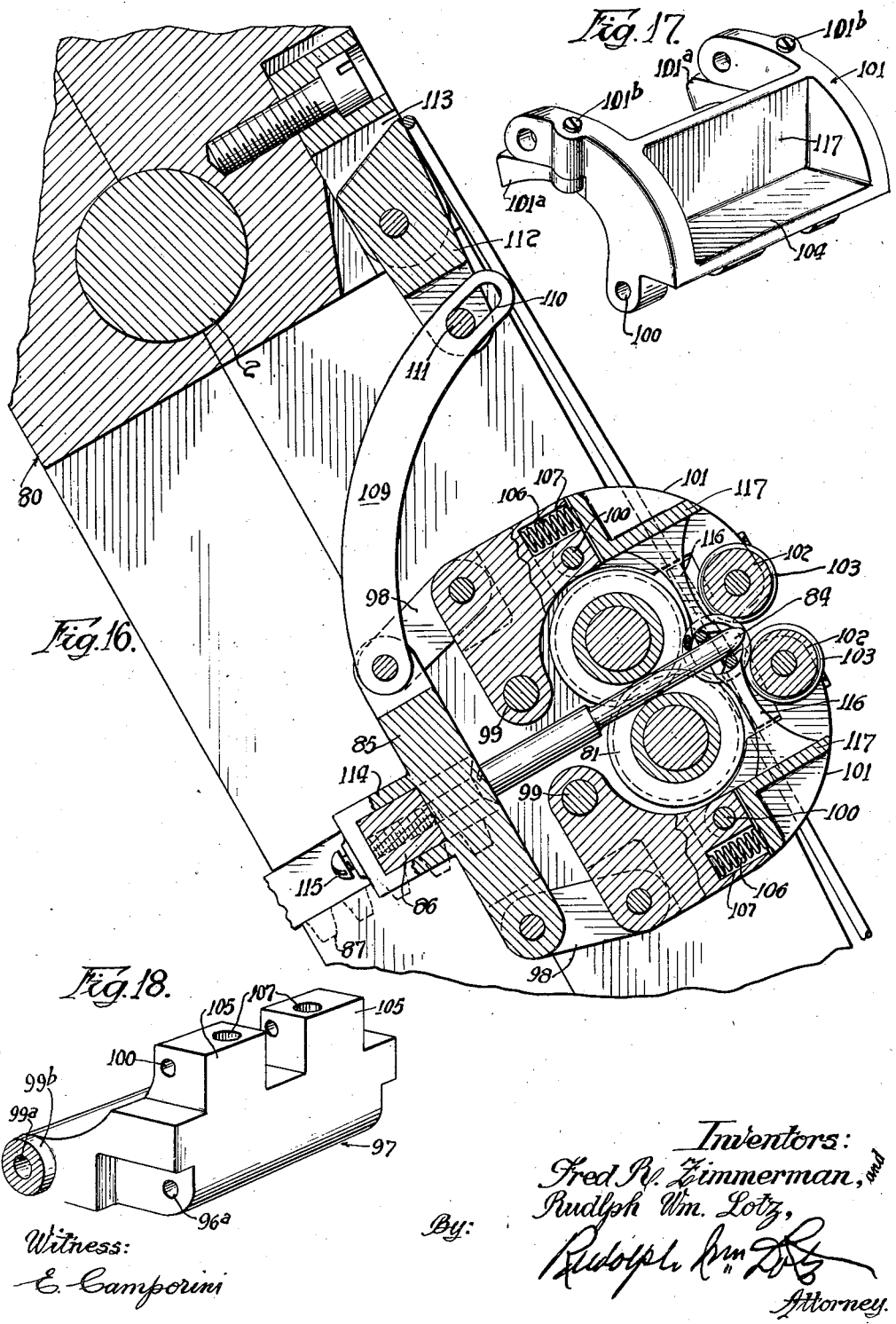

Patented June 16, 1942

2,286,326

UNITED STATES PATENT OFFICE 2,286,326

SPRING CONSTRUCTION ASSEMBLING MACHINE

Fred R. Zimmerman and Rudolph W. Lotz, Chicago, Ill., assignors to Nachman Spring-filled Corporation, Chicago, Ill., a corporation of Illinois Application July 1, 1940, Serial No. 343,422

33 Claims. (Cl. 140—3)

This invention relates to a mechanism for coupling parallel rows of upholstery springs by means of helical tie wires in the assembling of spring constructions for upholstery.

These spring constructions or assemblies are made of upholstery springs of the hour-glass type, which, in some instances, are of large diameter, such as four and one-half inches. The springs are disposed in parallel rows extending transversely of the side edges of the ultimate unit and the helical tie wires coupling the several rows of springs also extend transversely of the said side or longitudinal edges of the completed structure. In some instances, the springs of the said several rows are spaced apart so that their axes are separated a distance appreciably greater than the diameter of the component springs. This spacing apart of said springs is usually less along the side edge portions than along the middle portion of the ultimate product.

In other instances, springs of relatively small diameter, such as three inches, are employed which are only slightly spaced apart transversely of the side edges of the ultimate structure.

The most important and essential object of this invention is to provide a mechanism of the kind specified which is adjustable to the full extent necessary to the assembly of spring constructions composed of springs of diameters varying from a minimum of three inches, more or less, to a diameter of four and one-half inches, more or less, without limitation to the spacing apart thereof.

A further essential object of the invention is the provision of means to accomplish the foregoing object of the invention in a simple and expeditious manner.

In the manufacture of spring constructions of the type referred to it is very desirable to employ helical tie wires of the smallest possible diameter in order to minimize the movements of the component springs of the ultimate product relatively to each other and the tie wires within the confines of the latter.

Hence, another very essential object of the present invention is to adapt the mechanism to the use of helical tie wires of uniform small diameter and to couple upholstery springs of large and small diameters and in such manner as to minimize said movements of the springs relatively to each other and the said tie wires.

Another important object of the invention is to minimize frictional resistance to the rotatable advancing of the helical tie wires into encircling relation to overlapped spring portions and to this end utilize rollers extending over at least the entire width of the space occupied by the overlapped portions of two rows of springs to be encircled and to utilize said rollers as guides for the helical tie wires as well as anti-friction or driving means for said tie wires, electively.

Another object of the invention is to provide means for advancing rows of springs coupled by said tie wires so that the uppermost portions of the terminal coils of a row of springs of a partially completed spring construction will become positioned to be partially overlapped by another row of springs inserted into the machine preparatory to coupling said last-named two rows.

Another essential object of the invention is to provide spring locating means associated with the tie wire advancing rolls which are retractable from the path of travel of the tie wires introduced successively into encircling relation to overlapped spring portions for promoting the easy advancing of a partially assembled spring construction to successive predetermined positions.

Another object of the invention is to provide simple means associated with the tire wire advancing rolls whereby each new row of upholstery spring becomes overlapped with a preceding row thereof in a predetermined relation to the latter.

Other objects of the invention are pointed out in or will be readily understood from the following description of the mechanism.

Mechanism embodying the invention is illustrated in the accompanying drawings wherein:

Fig. 3 is a fragmentary similar to Fig. 2 showing the parts in another position.

Fig. 4 is a fragmentary sectional view of the same on the same scale as Fig. 5 taken on the line 4—4 of Fig. 1.

Fig. 5 is a fragmentary vertical sectional view of the same, on the same scale as Fig. 4 taken on the line 5—5 of Fig. 6.

Fig. 6 is a fragmentary view in elevation of a portion of the machine lying between the side frame members of the latter, on a larger scale than Fig. 3, looking to the left of the line 6—6 of Fig. 5.

Fig. 7 is a fragmentary vertical sectional view of the machine taken on the line 7—7 of Fig. 6.

Fig. 8 is a fragmentary vertical sectional view of the machine taken on the line 8—8 of Fig. 6.

Fig. 9 is a fragmentary detail sectional view taken on the line 9—9 of Fig. 7.

Figs. 10 and 11 are detail perspective views of spring engaging devices of the machine.

Fig. 12 is a fragmentary sectional view of the machine, similar to Fig. 8, but illustrating a modified form of construction.

Fig. 13 is a view similar to Fig. 6 showing mechanism of Fig. 12 in elevation from the spring engaging side thereof.

Fig. 14 is a fragmentary vertical sectional view of the machine of Figs. 12 and 13 taken on the plane of the line 14—14 of Fig. 13 and including the star-wheel of Figs. 6 and 7, not shown in Fig. 13.

Fig. 15 is a fragmentary sectional view similar to Fig. 14, showing the mechanism in another position.

Fig. 16 is a vertical fragmentary sectional view on an enlarged scale, taken on the line 16—16 of Fig. 13.

Fig. 17 is a detail perspective view of one of the roll carriers shown in Fig. 15.

Fig. 18 is a detail perspective view of one of the members carrying the device of Fig. 17.

Fig. 19 is a fragmentary view in elevation of a modified form of construction of the helical tie wire advancing rolls applicable to the structure of Figs. 12 to 15 inclusive.

Fig. 20 is a detail transverse sectional view of the same taken on the line 20—20, of Fig. 19.

Fig. 21 is a view similar to Fig. 19 illustrating a further modified form of construction of the rollers shown in Fig. 13.

Figure 1:
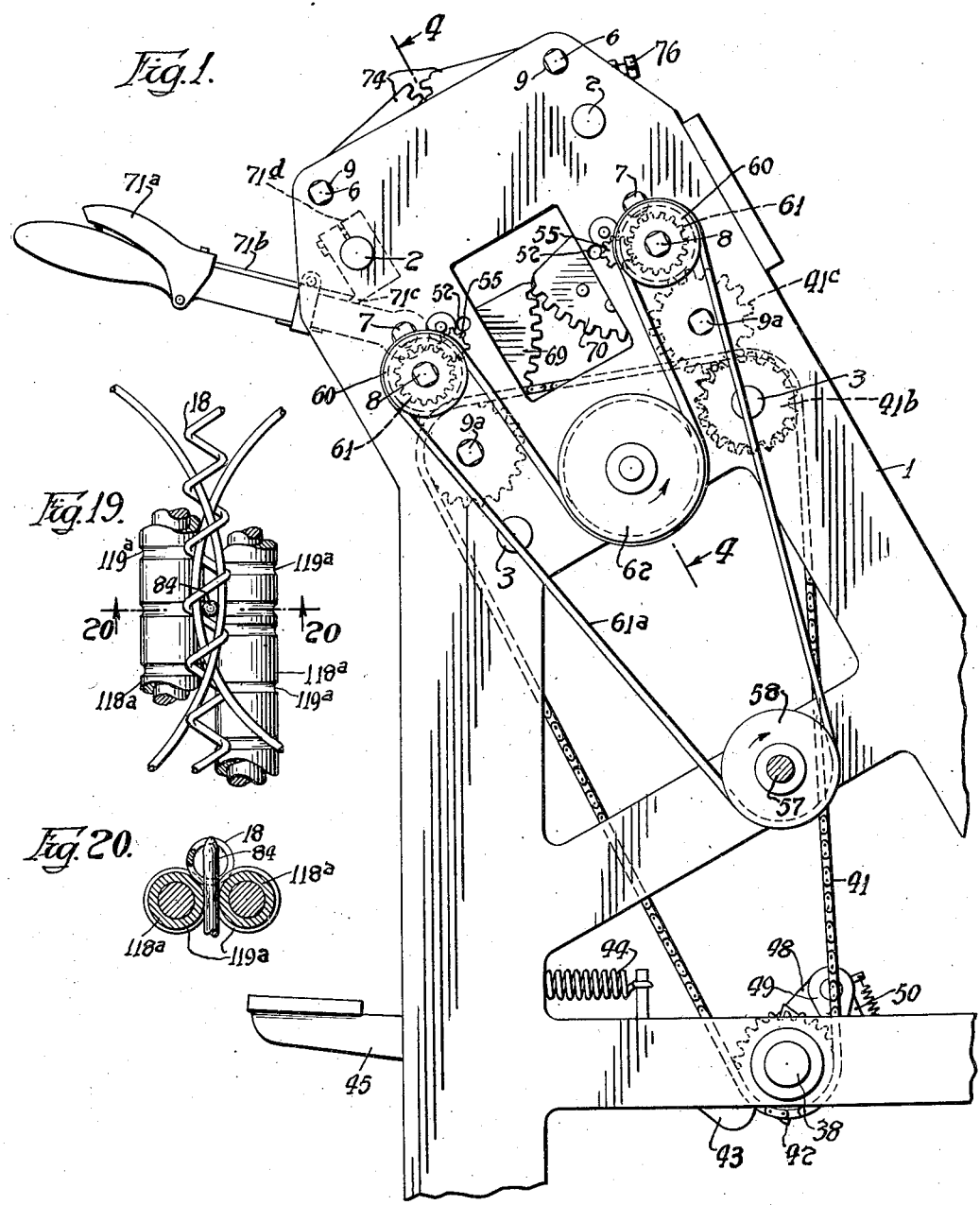
Fig. 1 is a fragmentary right hand side elevation of a machine constructed in accordance with the invention.

The machine includes two side frame members 1 supported upon the floor, the upper end portion of one of said members being illustrated on Fig. 1.

Rigidly secured at their ends to the side frame members 1 are parallel rods 2 and 3 respectively, upon which a series of heads 4 are mounted, only two of said heads being shown in Fig. 6 and one thereof in Fig. 4. The number of said heads will correspond with the number of upholstery springs in each row thereof to be coupled with a similar number of said springs in an adjacent row by means of a helical tie wire. The total number of said heads to be used may be changed as desired though the maximum number thereof may be maintained on the machine and only some of them used if the number of springs in a row is less than the number of said heads.

Generally, the rows of springs and the tie wire extend transversely of the side or longitudinal edges of the ultimate spring assembly of a maximum width, generally, of fifty-four inches, and a maximum length of seventy-two inches. The width of the machine frame may be in excess of seventy-two inches if desired so that the tie wires and the rows of springs coupled thereby may extend longitudinally of the ultimate structure, and also that the total number of heads 4 may be equal to the greatest number of springs of the smallest diameter included in each transverse row thereof as indicated above.

The width of each head will not exceed preferably the diameter of the terminal coils of the smallest springs to be incorporated into the spring assembly, as, for example, three inches more or less. Thus the number of heads used will vary with the number of springs of each row of the same. If the four and one-half inch springs are used, the greatest number thereof in each transverse row will not exceed twelve whereas if three inch springs are used the total number thereof will not exceed seventeen in each row. But if the rows extend longitudinally of the assembly of maximum dimensions, the number of springs of each row will be increased to cover the maximum dimension of seventy-two inches.

Each head 4 includes the removable parts 4a and 4b secured to the main part 4 by set screws 5. The screws 5 serve also to clamp the said heads upon the rods 2 and 3 against movement.

The said heads 4 are disposed in pairs, as shown in Fig. 1, with their flat, spring-engaging surfaces opposed, said heads of each pair being parallel and their side edges disposed in alignment with each other.

Two sets of rock-shafts, 6, 7 and 8, are journalled at their ends in bearings in the side frame members 1 and each thereof is equipped, preferably, with four flat faces between its ends, spaced from each other by arcuate portions engaged in the bearings 9 of the heads 4. A similar rotatable shaft 9a is provided which carries star-wheels 10 (Fig. 4), a bearing 9 for shaft 6 being shown in Fig. 1.

The respective sets of said rock-shafts journalled in the bearings of the opposed heads 4, rotate simultaneously in opposite directions but since each set thereof may operate independently of the other set by omission of the gear elements which cause simultaneous operation, description of the machine will be confined to one set of said heads and rock-shafts and parts associated therewith.

By reference to Figs. 5 and 7, it will be noted that a pair of rollers 11 extends through the gap 12 between the parts 4a and 4b of the head 4. Said gap is substantially triangular, the mouth portion thereof being contracted by overhang of arcuate portions 13 of said members 4a and 4b. The flat surface portions 4c of the last-named members are aligned and disposed substantially tangentially to the exposed surfaces of the said rollers 11. As all of the heads 4 are alike, the description of one thereof suffices for all of them.

In the instance illustrated in Fig. 4, the rollers 11 are mounted upon parallel shafts 14 which are journalled at opposite end portions in bearings in the frame members 1.

As shown in Fig. 6, the rollers 11 are provided with annular recesses 15 disposed in staggered relation to the larger diameter portions 16 thereof. Said rollers are so disposed that the larger diameter portions 16 of one thereof project into the annular grooves 15 of the other thereof, the purpose of this arrangement being to provide roller portions of the greatest possible diameter upon which the helical tie wires ride. Each larger diameter portion 16 is provided with an annular groove 17, the said grooves 17 of each roller 11 being spaced apart a distance equal to the length of one coil of the helical tie wire 18. The said larger diameter portions 16 of both rollers 11 define substantially an angular V-shaped recess in which the tie wire 18 travels, the rollers constituting guides for the said tie wire in cooperation with presser rolls 19 and channeled projections 20 at each side of each of the respective presser rolls 19. The spacing apart of the annular grooves 17 of one roller 11 from the grooves 17 of the other is such that the tie wire 18 will engage in the said grooves 17 of both rollers 11. Each presser roll 19 is provided with an annular groove 21 in which the tie wire 18 engages and which is properly spaced from the grooves 17 of rollers 11 to cooperate therewith to guide the tie wire 18 as the latter is rotatably advanced along said rollers 11.

The presser rolls 19 are idle and have their axes disposed angularly to those of the rollers 11 in harmony with the pitch of the tie wire 18.

Said rollers 19 are mounted in the bifurcated ends of arms 22 which are equipped with hubs rotatably associated with the rock-shaft 6. Rigidly mounted upon the latter at each side of the hubs of the arms 22 (Figs. 4 and 7) are the hubs 23 of arms 24, said hubs 23 being disposed in loose surface contact with the hubs of the arms 22. Each arm 24 is equipped at its outer end with a recess 25 and with a removable yoke 26 adjacent thereto in which a compression spring 27 is mounted. Said spring bears upon the arm 22 to force the idle roll 19 carried thereby yieldingly toward the rollers 11.

The spring responsive movement of the arm 22 with respect to the arm 24 is limited by the pins 22a of said arm 22 to such a degree that the idle roll 19 cannot move far enough toward the rollers 11 to prevent the forward ends of the wires 18 from engaging in the groove of the roll 19, said tie wires being required to force the arms 22 outwardly against the action of the springs 27.

The several arms 22 and 24 are disposed in staggered relation to the heads 4 and out of the path of travel of upholstery springs 28 inserted between the upper opposed surface portions of opposed blocks 4 (see Figs. 5 and 6).

Associated with the rollers 11 are two sets of spring locating devices 29 and 30, respectively, which are mounted upon the respective rock-shafts 7 and 8. Each set of said devices comprises three members which are spaced apart to be opposed to annular grooves 15 of the shafts 11 substantially midway between the side edges of the blocks 4, as shown in Fig. 6. The reference numerals 29 and 30 are applied to the hubs of said locating devices which include relatively thin flat arcuate fingers 29a, 29b and 29c of the set 29, and 30a, 30b and 30c of the set 30.

The upper set 29 of spring locating devices includes the middle one thereof, shown in Fig. 11, which is equipped with a pair of spaced apart fingers 29b which, as shown in Fig. 6, engage a convex portion of the lower upholstery spring while the fingers 29a and 29c engage a concave portion of the upper upholstery spring at points proximate to the crossing points of the overlapped portions of the two upholstery springs.

The finger 30b of the lower set engages a point in the convex surface of the upper upholstery spring and thus cooperates with the fingers 29a and 29c to hold firmly the arcuate portion of the upper upholstery spring, lying between the points of its engagement with fingers 29a and 29c in position to be encircled by the helical tie wire 18.

Similarly, the fingers 29b cooperate with the fingers 30a and 30c to hold firmly the arcuate portion of the lower upholstery spring, lying between the terminals of the fingers 30a and 30c, in position to be encircled by the helical tie wire 18.

The fingers of the respective sets of devices 29 and 30 are so positioned with respect to the tie wire guide grooves of the rollers as not to interfere with the free travel of the tie wire, the terminals of the fingers 29a and 29c being beveled, as shown in Fig. 6, for this purpose. The terminals of the fingers 30a and 30c are beveled also to accord substantially with the radius of the portions of the lower upholstery spring which they engage.

The pressure exerted upon the helical tie wire during its advancement along the rollers 11 by the rollers 19, forces said tie wire into contact with said rollers 11 with a force that tends to force them apart. The length of said rolls 11 and the small diameter of the shafts 14 upon which said rolls 11 are mounted, coupled with a certain degree of flexibility of the rolls 11 due to the widths and depths of the annular recesses 15 thereof, renders it necessary to provide means adapted to balance or substantially balance the pressure exerted upon said rolls 11 and to this end (see Fig. 7) some of the head parts 4a and 4b of the heads 4 are equipped with carriers 31 for idle rolls 32, said carriers being pivoted at one end at points 33 and connected at their other ends with tension springs 34 which serve to cause the rolls 32 to bear against the rolls 11 yieldingly but not with sufficient pressure to flex them. The said springs 34 will, however, resist flexing of said rolls 11 and shafts 14 by the aforesaid pressure of the tie wire. The said rolls 32 and the carriers therefor are provided in sufficient number and location along the length of the rolls 11 to perform their desired function efficiently.

By reference to Fig. 8 it will be noted that the plane in which the upholstery springs overlap each other, intersects the axes of the helical tie wire. Also, that the upper upholstery spring rests at substantially diametrically opposed points upon the outer edge of a flat bar 35 which is clamped at its upper end portion in the recess of a clamping member 36 mounted upon the head member 4a and which projects into the upper end of the opening 4a of said head member. A set screw 37 may be operated to contract the said recess and permits adjustment of the bar 35 which, in the instance illustrated, has its outer edge aligned with the axes of the tie wire. The other end portion of the bar 35 is engaged in the clamping member 36a of the head element 4b. The said bar 35 is provided with a shoulder 35a at a point slightly above the axes of the tie-wire, the surfaces of said bar 35 above and below the shoulder 35a being parallel with but offset from each other, a distance equal to the diameter of the wire of which the upholstery springs are made, so that as the lower upholstery spring passes out of engagement with bar 35 its uppermost portion will become disposed out of the path of the upper upholstery spring as the latter moves into overlapping relation to said lower spring.

The lower member 36a projects into the open space 4d in the head member 4b and is equipped with set screw 37a.

There is also shown in Figs. 6 and 7, the six armed star-wheel 10 which is mounted rigidly and adjustably about its own axes, upon the rotatable shaft 9a. Each arm of said star-wheel is brought successively into the position wherein one of its arms is disposed to constitute a support for the helical tie wire 18 at a point substantially midway between adjacent heads 4, thereby causing a lower upholstery spring connected with said tie wire to be so positioned as to cause its upper arcuate portion to lie in the path of the finger 30b.

Said star-wheels are disposed in staggered relation to the heads 4 and in number will be one less than the number of said heads 4.

The shafts 9a are geared to a shaft 38 journalled in bearings in the side frame members of the machine, by means of sprocket wheels 39 and 40, respectively, and the sprocket chain 41.

Mounted upon the shaft 38 is a ratchet wheel 42 (Fig. 2) equipped with teeth and also with V-shaped recesses disposed in staggered relation to said teeth. Said wheel is engaged by a dog 43 mounted pivotally upon one of the side frame members and which is maintained in said engagement by means of a tension spring 44 and normally engages in said V-shaped recesses.

Pivotally mounted at one of its ends upon the last-named side frame member, is a foot lever 45 which, adjacent its other end, is held normally at the upper limit of its movement in engagement with an adjustable stop 46, by means of a tension spring 47.

Rotatable on the shaft of the star-wheels is an arm 48 which carries a spring pressed pawl 49 normally engaged with the ratchet wheel 42. A link 50 connects the arm 48 with the lever 45, the arrangement being such, preferably, that when the lever 45 is depressed to the lower limit of its movement as determined by a suitable stop, it will cause the ratchet wheel to be rotated slightly more than sixty degrees and, upon return of said lever to the upper limit of its movement, the dog 43 will cooperate with a V-shaped recess of the wheel 42 to reverse the rotation of the latter so that the rotation of the star-wheels will be exactly sixty degrees from its preceding position.

One of the essential features of the invention is to render the spring locating means retractable from the path of the upholstery springs during insertion of the latter into the machine and their subsequent movement to second position so that upon completion of each coupling operation, effected by encircling overlapped spring portions with a helical tie wire, the operation of the lever 45 immediately following operation of another lever which effects retraction of the spring locating devices, such as 29b and 30b, the coupled rows of springs will move by gravity so that the last inserted helical tie wire will rest upon the arms of the star-wheels positioned in the path of and in supporting relation to said last-named tie wire. When said tie wire is in that position, the upper of the two rows of upholstery springs last coupled will be positioned so that the uppermost part of the terminal coils thereof lie immediately below the lower end of the bars 35. The lower end portions of the latter project into annular recesses 15 of the tie wire guide rolls. Another row of upholstery springs is then fed into the machine and becomes positioned as shown in Fig. 6 by action of the sets of locating devices 29 and 30.

The said tie wire guide rolls are mounted, preferably loosely, upon the shafts 14. Rigid with said shafts at the right hand end portions thereof (Fig. 4) is a pair of drive rolls 51 for the tie wire 18 and with which the three presser rolls, there shown, are associated.

The guide grooves of the said rolls 51 are so disposed relatively to an opening 52 in the right hand side frame as to cause a tie wire passed through the latter to become engaged automatically in said guide grooves. To this end the said opening 52 is provided with a helical guide groove 53 of the same pitch as the wire 18 and so located that a wire 18 passed through the opening 52 will become engaged in the guide grooves of the rolls 51 and successively in those of the guide rolls 11.

The right hand ends of the latter abut the left hand ends of the rolls 51 at the point 54 in Fig. 4, said point 54 being immediately to the left of the first head 4 of the series of the latter, but said point 54 may be to the right of the point indicated as far as about the middle of the first head 4 or farther as will appear hereinafter.

One of the shafts 14 (the lower one thereof) is driven by means of a spur-gear wheel 55 just outside the left hand side frame member, while the other of said shafts (the upper one) is similarly driven by means of a spur-gear wheel 56 just beyond the other side frame member.

As shown in Figs. 1, 2, 3 and 4, shafts 57 are journalled at their ends in bearings in the side frame members 1 and are driven by means of an electric motor (not shown) or in any other suitable manner.

Said shafts 57 are equipped with sheaves 58 and 59, respectively, at opposite sides of the frame members 1.

Mounted rotatably on the outer ends of the rock shafts 8 on the right hand side of the machine (Fig. 1) is a pair of sheaves 60, each of which is rigid with a spur-gear wheel 61 for driving the spur-gear pinions 55 and 56, respectively, for driving the lower shafts 14 of the tie wire drive rolls.

A belt 61a is trained over the sheaves 58 and 60 and over an idle sheave 62 for actuating the said lower shafts 14 at the right hand side of the machine.

The upper shafts 14 are similarly driven by means of spur-gear wheels 63 meshing with spur-gear pinions on the upper shafts 14, said wheels 63 being rigid with the sheaves 64 and 65 on the outer ends of the rock shafts 7 at the left hand side of the machine. The belt 66 trained over sheave 59, the sheaves 64 and 65 and the idle sheave 67 effects drive of the upper shafts 14 in the same direction as the lower shafts 14 are driven. The sheaves 64 and 65 are rotatable on the axes of the rock shafts 7.

The rock shafts 7 and 8 at front and rear, respectively, of the machine, are equipped with intermeshing spur-gear pinions 68 for causing them to rotate in unison in respectively opposite directions for actuating the sets 29 and 30 of spring locating fingers. Intermeshing segmental spur-gear wheels 69 and 70 mounted upon the ends of the rock shafts 7 cause the latter to rotate in unison in respectively opposite directions. A hand lever 71 on one of the rock shafts 7, is actuated by the operator to actuate the sets 29 and 30 of locating fingers.

Figure 2:
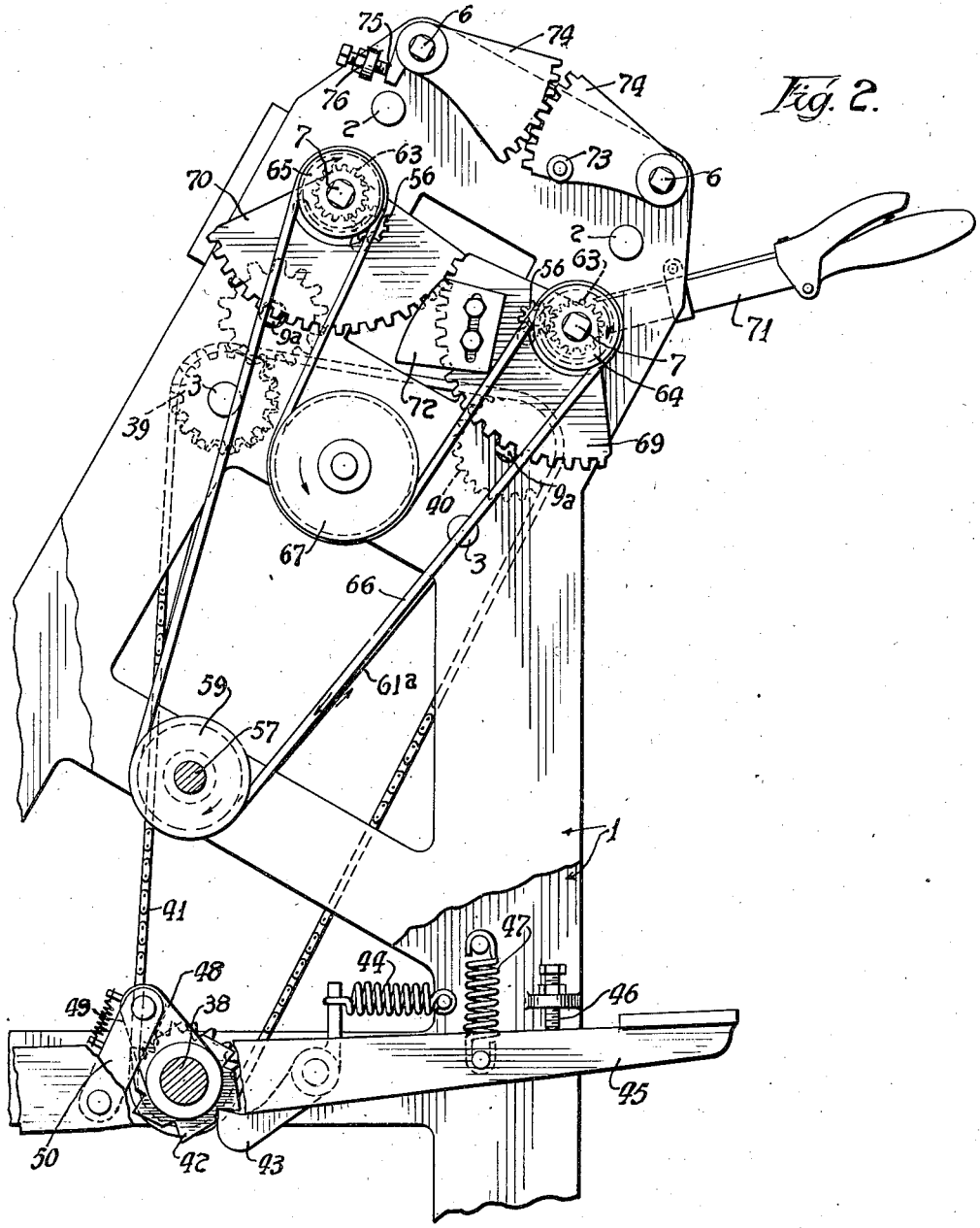
Fig. 2 is a fragmentary left hand side elevation of the same.

As shown in Figs. 2 and 3, illustrating the left hand side of the machine, the segmental gear element 69 carries a cam member 72 which engages an antifriction roller 73 on one of the segmental gear elements 74 (which are mounted on the respective rock shafts 6 to cause the latter to rotate in unison) when the lever 71 is swung to the lower limit of its movement to cause movement of the locating devices 29 and 30 out of the paths of the upholstery springs simultaneously with the swing of the arms 22 to throw the idle rolls 19 out of engagement with the helical tie wire 18 due to upward swing of the segmental gears 74. The said idle rolls 19 on respectively opposite sides of the machine, obviously move toward each other as the gears 74 swing upwardly.

One of said gears 74 is equipped with a stop arm 75 which engages the adjustable stop 76 on the adjacent side frame member 1 to limit the swing of the arms 24 in the direction wherein the idle rolls 19 are thrown into the paths of the tie wires 18. The weight of said gears 74 is sufficient to cause the rock shafts 6 to return to the positions indicated in full lines in Fig. 7 as the lever 71 is swung to the position of Fig. 2. A spring may be suitably associated with the gears 14 to maintain them normally firmly in the position of Fig. 2.

The sprocket chain 41 is also trained over a sprocket wheel 41a (Fig. 3) which is rigid with a spur-gear wheel 41b (Fig. 4) meshing with the spur-gear wheel 41c mounted on the rear star-wheel actuating shaft.

In the instance illustrated, the machine is designed to permit two of the helical tie wires 18 to be advanced simultaneously or substantially so, into encircling relation to overlapped portions of upholstery springs at opposite ends of two rows of the latter between intervals of feeding additional rows of said springs into the machine. The latter is also designed to take advantage of the force of gravity for advancing the progressively assembled spring construction from one position to another and additionally to economize floor space and also to enable the operator to see clearly the faces of the blocks 4 opposed to the ends of the upholstery springs and to see the operations of the locating fingers 29 and 30 and the advance of the helical tie wires into encircling relation to the overlapped spring portions, all of which is very desirable in order to minimize the production of faulty spring constructions, the disassembling of the latter and at least partial re-assembling thereof to remedy defects.

However, it is obviously possible to dispose the blocks 4 horizontally by remodeling the side frame members and making other slight changes in the machine.

By removing the upper set of blocks 4 and parts associated therewith the machine may be operated to couple rows of upholstery springs at one end only by means of the lower mechanism as one machine and then, reverse the so-assembled structure and couple the other ends of the springs in another machine of the same type. In such event the blocks 4 would be disposed more horizontally and with their spring supporting faces substantially flush with a table surface.

The spacing apart of the opposed sets of blocks 4 as illustrated in the accompanying drawings, is preferably such that the upholstery springs will be very slightly compressed therebetween to impart only sufficient frictional resistance to the movement by gravity of the last inserted row of springs from the position in which they are placed by the operator, this degree of frictional resistance being so slight that upon completing the coupling of the first two rows of springs of a construction, the weight of the lower row of springs will suffice to overcome the same and move the two rows of springs by gravity to the next station.

After the first two rows of upholstery springs have been coupled by a tie-wire 18, and have been moved downwardly as last above described, the tie-wire 18 thereof will be disposed in the path of travel of the arms of the star-wheels 10 which become positioned next in supporting relation to the next succeeding tie-wire 18 coupling the second inserted row of springs with the third row thereof inserted into the machine, so that as said star-wheels approach each succeeding limit of movement, they will engage succeeding tie-wires 18 and move them downwardly over the surfaces of the lower rollers 11. To this end each downward movement of the foot-lever 45 may be such as to rotate the star-wheels through an arc of seventy degrees to impart a projecting impulse to the tie-wire 18 then disposed in the path thereof as, upon release of said lever and its return to the upper limit of its movement, the dog will reverse the rotation of the star-wheel through the excess arc of ten degrees through which it is rotated by the depression of said lever 45.

The lever 71 is equipped with a hand-lever 71a normally held at the outer limit of its movement by a spring and which is pivotally connected with reciprocable latch-plunger 71b. The latter engages a projection 71c of a collar 71d mounted upon the cross-rod 2 (Fig. 1) and serves to hold said lever 71 at the upper limit of its movement.

In Figs. 12 to 20 inclusive, there is illustrated another embodiment of the invention insofar as the tie-wire guide rolls and presser rolls are concerned which may be substituted for these parts, as illustrated in Figs. 1 to 11 inclusive and hereinabove described and affords advantages over the latter in some respects as will appear from the following description.

In the last mentioned embodiment the blocks 80 correspond substantially with the blocks 4 of Figs. 1 to 11 though the rock-shaft 6 may be and preferably is omitted and the rock-shafts 7 and 8 are omitted. The rollers 81 will correspond with the rollers 11 in all respects, except that additional space must be provided at intervals equal to the length of a coil of the helical tie-wire 18, in the shape of additional annular grooves 82 of the rollers 81 disposed in staggered relation to the annular grooves 83 thereof in which the tie-wire 18 engages. The grooves 82 of the rollers 81 are directly opposed to each other and provide spaces for the passage of reciprocable spring locating pins 84 which, take the place, in part, of the locating fingers 29 and 30.

The said pins 84 are mounted upon cross-heads 85 carried by a bar 86 extending over the entire width of the machine frame between the members 1.

Said bar 86 is equipped at its ends with rack-bars 87 which mesh with spur-gear pinions 88 rigid with the rockshaft 89 (Fig. 12) which carries the lever 90. The latter corresponds with the lever 71 and is connected by means of a link 91 with the arm of the rock-shaft 92 which is equipped with spur-gear pinions 93 meshing with rack-bars 94 of the bar 95 which carries cross-heads upon which the locating pins 84 of the opposite set of heads 80 are mounted.

As shown clearly in Figs. 14, 15 and 16, the said pins 84 pass through the rectangular openings in the heads 80 substantially centrally thereof. The cross-heads 85 are connected at their ends with the elbows 96 of bell-crank levers 97 by means of links 98 which are pivotally secured to the side rails of the heads 80 by means of the pins or shafts 99. The other arms of said bell-crank levers 97 extend substantially perpendicularly to the portions thereof lying between the shafts 99 and their pivotal connections with the links 98, one of said levers 97 being illustrated in detail in Fig. 18 wherein the opening 96a receives the pivot pin for the connection with links 98 and the opening 99a receives the pin or shaft 99.

Pivotally connected with each bell-crank lever 97 at point 100 (Fig. 17) is a roller carrier 101 for an idle roll 102 axially parallel with the rollers 81 and which are equipped with annular tie-wire engaging grooves 103.

Said idle-roll carrier 101 is equipped with a flat bottom flange 104 which overhangs the projections 105 of the lever 97 and is spaced slightly from the latter for limited pivotal movement relatively thereto against the action of compression springs 106 mounted in the pockets 107 of said projections.

The said springs 106 normally maintain the idle rolls 102 compressed against the tie-wire 18 and are so limited as to movement in that direction by the portions of the upper surfaces of the projections 105 opposed to the webs or flanges 104 of the roll carriers as to normally maintain the idle rolls in position to enable the tie-wire 10 to pass into engagement with the grooves of said idle rolls when said bell-crank levers are disposed in the position of Figs. 14 and 16.

The side arms of the roll-carriers 101 are adapted to engage at their ends below the rollers 102 the concave sides of the upholstery springs at substantially the crossing points of the overlapped arcuate portions of the latter as shown in Fig. 13.

Each cross-head is equipped with an arcuate arm 109 provided with a longitudinal slot 110 in the outer end of which a pin 111 at the lower end of a lever 112 engages. Said lever 112 is pivotally secured between its ends in the bifurcated end of an arm 113 mounted upon the upper end portion of the block 80 above the rectangular opening thereof.

The upper end of the lever 112 is equipped with a cam surface which is eccentric to the pivot pin of said lever and which projects into the path of the terminal coil of a spring of the row last inserted into the machine and provides a temporary stop for the same while the cross-bar 85 (and parts associated therewith) is disposed in the position of Fig. 15, said stop permitting said spring to fall to a point slightly below its ultimate position as determined by the terminals of the side arms of the idle roll carriers.

The side stop is disposed out of the path of the spring when the cross-bar and associated parts are in the position of Figs. 14 and 16.

The idle rolls 102 move through the terminal coils of the upholstery springs and are spaced from the side portions of the latter as are also the presser rolls 19, of the structure of Figs. 1 to 11, and are disposed out of the paths of said terminal coils when the lever 90 is disposed at the lower limit of its movement.

In the structure of Figs. 12 to 20 inclusive the star-wheels operate in exactly the same manner and perform the same function as in the structure of Figs. 1 to 11. In the latter the adjustment of the blocks 4 toward each other to adapt the machine to receive smaller diameter springs than those shown, is limited by the space occupied by the hubs of the arms at each side of the arms carrying the presser rolls 19 whereas, in the structure of Figs. 12 to 18, the sole limitation for said adjustment is fixed by the width of the star-wheels.

The cross-heads 85 are equipped with yokes 114 and set screws 115 so that they may slide along the bars 86 and be guided in different positions along the latter and there secured.

Obviously in order that the tie-wire receiving and guiding grooves of the rollers may be always positioned properly with respect to the overlapped spring portions of the rollers 11 and 82 and the presser rolls 19 and 102, the said heads 4 and 80 of the respective structures must be moved toward and away from each other a distance constituting the equal of that which separates the guide grooves of a roller 11 or 81, or a multiple of said distance, in order that the tie-wire 18 may properly encircle the overlapped spring portions, though the adjustability of the fingers of the sets 29 and 30 about their own axes allows for an appreciable degree of tolerance in this respect.

As shown in Figs. 13 to 17, the side arms of the carriers for the idle rolls 102 are equipped with adjustable spring engaging fingers 101a secured by set screws 101b to said side arms for swing about the axes of the latter from positions in which their front ends engage springs of large diameter at their crossing points to positions wherein they will engage smaller diameter springs at their crossing points which, obviously, would be less spaced apart than the crossing points of larger diameter springs and which would provide also the degree of tolerance relating to adjustment of the heads 80, into less or greater spacing from each other and with respect to the tie-wire engaging grooves of the rollers 81 that may be required to produce the desired results.

In Figs. 19 and 20, adjacent to Fig. 1, there is shown a pair of helical tie-wire drive rolls 118a which are of uniform diameter throughout their lengths and are provided at regular intervals with the annular grooves 119a in which the tie-wires 18 engage. Said rollers 118a may be substituted for the rollers 11 or 82 and employed in connection with spring locating devices 29 and 30 or the spring locating devices of Figs. 12 to 18 inclusive (the locating pin of the latter being shown) it being necessary, however, that said rollers 118a be of appreciably smaller diameter than the rollers 11 or 102 in order to be used with a tie-wire of the same diameter as that shown in Figs. 1 to 18 inclusive.

As shown in Fig. 18, the bell-crank levers 97 are equipped with bosses or hub part 99b, only one of which is shown, which are of such length that their outer ends will abut the side walls of the rectangular opening in the head 80 in which said bell-crank levers are received though said hub-parts 99b may be of such length as to allow of slight lateral movement of the bell-crank levers within said openings to provide for the adjustment tolerance hereinabove referred to.

Such adjustment tolerance as may be allowed for by said hub parts 99b as last above mentioned will be effective under certain conditions in cooperation with the lower portions of the side arms of the idle-roll carriers 101 which comprise the laterally adjustable arms 101a each of which is engaged by the lower end of a set screw 101b extending through one of said side-arms as shown in Figs. 13, 14, 15 and 17.

The outer ends of the arms 101a of the lower idle-roll carrier 101 may, for example, be swung inwardly or toward each other from the position shown in Fig. 13 to so engage the lowermost part of an upper upholstery spring as to flex the arcuate portion thereof lying between said points of contact with the arms 101a to a smaller radius. This will necessitate a corresponding adjustment of the arms 101a of the upper idle-roll carrier 101 or a temporary removal of said last named arms 101a since the lower upholstery springs will be suspended from the locating or spacing pin 84.

Other relative arrangements than that shown and described of the devices for maintaining the upholstery springs engaged firmly with the locating or spacing pin 84 and flexing the arcuate portions of one or both the overlapped portions of pair of said springs, may be provided, to meet the requirements that are parts of the upholstery springs or of the devices for retaining them in place during the encircling thereof by the helical tie wire 18 shall be disposed in the path of the forward end of the latter. To this end locating pins 84 of different cross-sectional shapes and dimensions than the one shown may be made interchangeable with the latter for cooperation with the elements 101a or substitutes therefor may be provided for cooperation therewith to bring about the desired results. These interchangeable parts or variations may be required to meet the conditions incident to the assembling of upholstery springs of larger or smaller diameter than those illustrated.

Thus, for example, a middle projection or arm 116 may be mounted upon the cross-bar or web 117 of the idle-roll carrier, as shown in Fig. 16, the outer end of which is opposed to the locating pin 84 to press the lowermost point in the upper upholstery spring against lower side of the said pin. In that event the elements 101a of the upper roll-carrier 101 may be adjusted in divergent relation to each other to engage the concave portion of the upper spring at points well spaced outwardly from the crossing points of the two springs for flexing the arcuate portion of the upper spring lying between the points of contact with the last mentioned devices 101a to a longer radius if that should be desirable or necessary.

The rollers 11 and 81, respectively, may be of larger maximum diameter than illustrated and the annular recesses alternated with said larger diameter portions be of the same depth as those illustrated to allow for lateral adjustment of said rollers toward and from each other to accommodate helical tie-wires of different diameters. So also, the smaller diameter portions of the rollers 11 and 81 may be spacing sleeves interposed between larger diameter portions of said rollers and said spacing sleeves may be of different lengths interchangeable with each other to accommodate helical-tie wires of longer or shorter pitch than wire 18.

In the instance of Fig. 21 it will be noted that the larger diameter portions of the rollers 81 are of less length axially than the similar parts of the rollers 11 to accommodate the pin 84 while the small diameter portions are of correspondingly greater length.

Obviously to permit relative lateral adjustments of the rollers 11 and 81, respectively, as above indicated, the bearings for the shafts of said rollers must also be similarly adjustable and since such adjustable bearings are commonly used for pairs of rollers in various types of machinery, illustration of such bearings is omitted from the drawings.

In the event that it should be found desirable to drive the helical tie-wires at a number of points along their shafts, selected ones of the larger diameter parts of the rollers 11 and 82, respectively, if the latter are made in sections or are spaced apart by spacing sleeves as above described, may be equipped with set-screws 118 to secure them against rotation on their shafts.

A stop device 119 (Fig. 4) is associated with the tie-wire guide rollers 11 and 81, respectively, and is disposed in the path of the front extremity of the tie wire 18 at a point beyond the overlapped portions of the last pair of upholstery springs of two rows of the latter. The said stop may be disposed so that only one or two terminal coils of the tie-wire 18 pass beyond the crossing point of the overlapped spring portions nearest adjacent the left-hand side frame member 1. Said stop may be rigid or it may be movable responsively to pressure exerted thereon by the extremity of the tie-wire and in such event may constitute a switch member or a switch member actuating means controlling a solenoid circuit, such solenoid to be operatively associated with the lever 71 for throwing the same from the upper to the lower limit of its movement in a manner which is obvious to those skilled in the art. Said solenoid may be also operatively associated with the star-wheel shaft in such manner that the latter 15 rotated to the extent above described immediately following the actuation of the lever 71. Said solenoid and circuit are omitted from illustration as being superfluous and readily understood without special illustration and specific description.

Preferably the tie-wires 18 are cut into the shortest lengths required to encircle all overlapped spring portions of two rows of springs with only one or two additional terminal coils which may be distorted in any one of several conventional ways to prevent the tie-wires from being disengaged from any of the overlapped spring portions in whole or in part.

Obviously this limitation of length of the tie-wires 18 will cause the latter to become disengaged progressively from the drive rollers 51 as the rear end portions of said tie-wires approach the point 54 (Fig. 4), the driving force applied to the tie wires by the drive rollers 51 being thus gradually reduced and becoming nil after said rear extremity of the tie wire passes the last of the series of presser rolls engaged with said drive rolls.

Accordingly to assure continued advancement of the tie wire until it reaches the predetermined limit of its advancement, sectional parts of the rollers 11 at the other ends of the shafts 14, may be rendered non-rotatable relatively to said shafts 14 by means of the set screws 118 or otherwise, throughout a length sufficient to take up the driving of the tie wire from a point at which the driving force of the rollers 51 decreases appreciably. Said roller sections so secured against rotation relatively to the shaft 14 may be those which are most directly affected by the pressure of the last one of the presser rolls 19 of the series which is disposed immediately in advance of the last pair of overlapped springs of the two rows to be encircled by the tie wire.

If, for example, the roll 19 of Fig. 6 were the last of the series thereof and disposed as shown in said Fig. 6 in advance of the right-hand pair of upholstery springs, which is assumed to be the last pair of the two rows then the three large diameter portions of rollers 11 (or 81) of each shaft 14 most nearly adjacent said roll 19 would be rendered rigid with said shafts 14 and thus drive the tie-wire. The remaining roller-portions to the right of those secured against rotation, as above, may be idle or may also be rigid with the shafts 14 as they are practically incapable of exerting any driving force on the tie wire without the aid of presser rolls or equivalents thereof.

The idle portions of the rollers 11 and 82 are, of course, driven frictionally by the shafts 14 in cooperation with the presser rolls 19 actuating the tie wire 18 to cause such drive. The said idle portions or sections thus reduce frictional resistance to the advancement of the tie wires to the vanishing point as opposed to the resistance offered by the walls of guide channels commonly used in machines of the same general class.

As shown in Fig. 21, both the drive and guide rollers 81 may be appreciably shorter along their larger diameter portions than the similar portions of the rollers shown in Figs. 1 to 11 inclusive in order to provide spaces through which the locating pins 84 project, said spaces being separated a distance equal to the length of a coil of the tie-wire and thus controlling the extent to which the heads 4 may be spaced apart to accommodate springs of different diameters and of members in the rows of same necessary to cover the standard width of the ultimate spring assembly.

Thus if the heads 4 are to be moved toward each other to decrease spacing apart thereof, such decrease is required to be equal to the length of a coil of the tie wire or to a multiple of such length.

Operation

In the operation of the machine as illustrated and described, the operator first inserts a row of upholstery springs between each pair of opposed heads 4 with the uppermost points in the terminal coils of said springs disposed substantially in contact with the shoulder between the ends of the bar 33 where said springs are held frictionally, due to slight contraction thereof by reason of their greater length than the distance separating opposed bars 33.

A second row of springs is then inserted to a position wherein the lowest arcuate portions in the terminal coils of said springs overlap the uppermost arcuate portions of the terminal coils of springs first inserted.

At this time the lever 71 will be disposed at the lower limit of its movement, the presser rolls 19 out of engaging relation to a tie wire 18 and the spring locating devices disposed in their retracted positions.

The operator then inserts the forward end portions of a pair of tie wires through the guide openings in the side frame 1 at the right hand side of the machine, rotating the same by hand through the helical guide recesses 53 until the forward end portions of said tie wires 18 are disposed for engagement by the first of the presser rolls 19 associated with the drive rollers 51.

The lever 71 is then swung to the upper limit of its movement and thereby the spring locating devices are thrown into engagement with the overlapped portions of the springs and will hold the latter in the predetermined positions relatively to the tie wire guide grooves of the rollers 11 to effect encirclement of the overlapped spring portions by the tie wire without bringing the latter into such snug surface contact with said springs at any point as will produce any appreciable frictional resistance to the advancement of the tie wire.

The shafts 14 may rotate continuously and thus actuate positively the drive rollers 51 and sections of the rollers 11 (or 81) rigid with said shafts.

As soon as the lever 71 has been swung to the upper limit of its movement, the tie wires will be rotated and become engaged progressively with the guide grooves of the rollers 51 and 11 (or 81) and will encircle progressively the overlapped spring portions until the forward extremity of the tie wire strikes the stop 119.

If the latter is rigid, the further rotation of the tie wire will cease even though the driving rollers continue to rotate.

If, however, the stop 119 is arranged to effect closure of a circuit through a solenoid connected with the lever 71 to swing the latter to the lower limit of its movement, then the manual operation of said lever is eliminated. But whether said lever is operated manually or automatically is immaterial in that the result so far as throwing the spring locating means out of engagement with springs and out of the path of the latter and the tie-wire is concerned and the throwing of the presser rolls out of engagement with the tie wires is concerned.

After the first pair of tie wires has been associated with the two rows of springs first inserted into the machine, the operator pushes down said two rows, now coupled, the tie wire coupling said rows becoming supported upon arms of the star-wheels 10 then in the path thereof.

Another row of springs is then inserted by the operator and all of the foregoing operations are repeated with respect to insertion of another pair of tie wires and the operations of the lever 71 to bring it first to the upper and then to the lower limit of its movement.

After the lever 71 has been swung to the lower limit of its movement (following the insertion of the second and succeeding tie wire) foot-lever 45 is depressed to cause rotation of the star-wheels 10 through an arc of sixty degrees as above described thus causing an arm of each of the latter to strike the tie wire between adjacent coupled pairs of springs to project the latter downwardly, said last-named arms remaining positioned in the path of another of said tie wires, these operations being repeated until the spring assembly is completed.

We claim as our invention:

1. A mechanism for joining the rows of upholstery springs comprising a support for two rows of said springs, means for maintaining said springs of one row in overlapped relation to the springs of the other row, a pair of rollers equipped with annular grooves, the grooves of one row alternated with those of the other row, the larger diameter portions of said rollers equipped with annular grooves in which a helical tie wire is adapted to be engaged throughout a length substantially equal to length of said rows of springs, presser rolls associated with said rollers for maintaining the tie wires engaged in the last-named grooves, and mechanism for rotating and advancing the helical tie wires along said rollers and into encircling relation to the overlapped portions of said springs.

2. In a machine of the type specified, a pair of rotatable rollers having parallel axes spaced apart a distance appreciably less than the larger diameter portions of said rollers, the latter equipped with spaced apart annular grooves disposed in staggered relation to each other and provided with annular helical tie wire guiding grooves in their larger diameter portions, devices associated with said rollers to cause a helical tie wire to engage progressively in said last-named grooves, a support for two rows of upholstery springs, means associated with said rollers to maintain portions of terminal coils of the springs of one row in overlapping relation to terminal coil portions of the springs of the other row over the said pair of rollers, and mechanism for rotating and advancing a helical tie wire along said rollers into encircling relation to the overlapped spring portions.

3. In a machine of the type specified, a pair of equal parallel rotatable rollers each having portions of large diameter alternated with portions of smaller diameter and their larger diameter portions disposed in overlapping and staggered relation to each other with the axes of said rollers spaced apart a distance less than the larger diameter of either of said rollers, the larger diameter portions of said rollers equipped with annular tie-wire engaging and guiding grooves, devices for causing a helical tie wire to engage progressively in said grooves, mechanism for rotating and advancing a helical tie wire along said rollers, and mechanism for maintaining overlapped terminal portions of springs of two rows of the latter disposed over said rollers for encirclement by the helical tie wire as the same is advanced along said rollers.

4. In a machine of the type specified, a pair of parallel rotatable rollers each having portions of large diameter alternated with portions of smaller diameter and their larger diameter portions disposed in overlapping and staggered relation to each other with the axes of said rollers spaced apart a distance less than the larger diameter of either of said rollers, means associated with said rollers for causing a helical tie wire to be engaged successively with the larger diameter surfaces of said rollers as the same is rotated and advanced along the same, and devices disposed in staggered relation to said larger diameter portions of said rollers for maintaining overlapped terminal portions of springs of two rows of the latter disposed over said rollers for encirclement by the helical tire wire as the same is advanced along said rollers.

5. In a machine of the type specified, a pair of equal, parallel rotatable idle-rollers each having portions of large diameter alternated with portions of smaller diameter and their larger diameter portions disposed in overlapping and staggered relation to each other with the axes of said rollers spaced apart a distance less than the larger diameter of said rollers, mechanism for maintaining overlapped terminal portions of springs of two rows of the latter, disposed over said rollers for encirclement by the helical tie wire as the same is advanced along said rollers and mechanism for rotatably advancing a helical tie wire along said rollers and driving the latter.

6. In a machine of the type specified, a pair of equal, parallel rotatable idle-rollers each having portions of large diameter alternated with portions of smaller diameter and their larger diameter portions disposed in overlapping and staggered relation to each other with the axes of said rollers spaced apart a distance less than the larger diameter of said rollers, mechanism operable to maintain overlapped terminal portions of springs of two rows of the latter disposed over said rollers for encirclement by a helical tie wire as the same is advanced along said rollers and operable to become disposed out of said position following encirclement of said spring portions by said tie wire to permit advancement of the springs to a new position, and mechanism for rotatably advancing a helical tie wire along and driving said rollers.

7. In a machine of the type specified, a pair of equal, parallel rotatable idle-rollers each having portions of large diameter alternated with portions of smaller diameter and their larger diameter portions disposed in overlapping and staggered relation to each other with the axes of said rollers spaced apart a distance less than the larger diameter of said rollers, means associated with said rollers for causing a helical tie wire to be engaged successively with the larger diameter surfaces of said rollers as the same is rotated and advanced along the same, and devices disposed in staggered relation to said larger diameter portions of said rollers for maintaining terminal coil portions of two rows of springs in a given portion over said rollers, and mechanism for rotatably advancing a helical tie wire along said rollers and into encircling relation to said spring portions.

8. In a machine of the type specified, the combination with a mechanism for rotatably advancing a helical tie-wire and including a series of rollers extending throughout a predetermined length of travel of such tie wire, of a plurality of spaced apart heads provided with recesses through which a pair of said rollers extends and having surfaces at each side of said rollers upon which terminal coils of springs of two rows are adapted to bear, devices mounted upon said heads and operable to engage parts of the springs of each row to hold the springs of one row in partially overlapped relation to those of the other row over said pair of rollers for encirclement by a helical tie wire rotatably advanced along said rollers, mechanism for rotatably advancing a helical tie wire along said rollers, and means for varying the spacing apart of said heads to vary the number of springs of the two rows to be coupled within the length of said rollers.

9. In a machine of the type specified, the combination with a mechanism for rotatably advancing a helical tie-wire and including a series of rollers extending throughout a predetermined length of travel of such tie-wire for engagement with and guiding the latter, of a plurality of spaced apart heads provided with recesses through which a pair of said rollers extends and having aligned surfaces at each side of said rollers upon which terminal coils of springs of two rows are adapted to bear, spring locating means movable into and out of the path of the said terminal coils of said springs for maintaining overlapped portions of springs disposed on opposite sides of said pair of rollers disposed in position to be encircled by a helical tie wire rotatably advanced along said rollers, said heads being adjustable along said rollers for varying the spacing apart of said heads to accommodate a greater or lesser number of springs along a given length of said rollers.

10. In a machine of the type specified, a pair of parallel rollers each having large diameter and small diameter portions alternated with each other and disposed so that the larger diameter portions of one of said rollers overlap the larger diameter portions of the other and are opposed to and spaced only slightly from the smaller diameter portions thereof, the larger diameter portions of said rollers being of length equal substantially to the length of a single coil of a tie wire of given pitch, each of said larger diameter portions of said rollers equipped with an annular groove and said grooves of each roller spaced apart a distance equal to th length of one coil of said tie-wire and adapted to engage the latter for guiding the same during rotation thereof coincidentally with said rollers.

11. In a machine of the type specified, a series of heads disposed side by side and adjustable relatively to each other to vary the spacing apart thereof, a pair of circumferentially grooved shafts extending through all of said heads for driving and guiding a helical tie wire into encircling relation to overlapped springs engaged with said heads, presser rolls associated with said rollers and said heads, spring locating devices on all of said heads movable with the latter as the same are adjusted to vary their spacing apart, a rock shaft common to all of said presser rolls for actuating the same in unison, and a rock-shaft common to all of said spring locating devices for actuating the same in unison.

12. In a machine of the type specified, a series of heads adjustable relatively to each other to vary their spacing apart and each equipped with a surface for support of end coils of a pair of upholstery springs, a pair of parallel tie-wire advancing and guiding rolls passing through recesses in all of said heads and disposed substantially tangentially to said surfaces, idle rolls operatively associated with said rollers to maintain a tie-wire yieldingly engaged with the latter and operable to be disengaged from said tie wire, a spring locating means mounted in each of said heads and operable in unison with said presser rolls to engage and disengage springs supported upon said surfaces and for movement into and out of the path of the tie wire for permitting springs coupled by the latter to be shifted laterally of said rollers, and a single lever operatively associated with said presser rolls, and said locating means for actuating both of the same during a single movement of said lever from one to another of the limits of its movement.

13. In a machine of the type specified, a pair of parallel side frame members, cross-bars connecting the same, a series of spring supporting heads carried by and adjustable along said bars to vary their spacing apart, a pair of tie-wire guiding rollers parallel with said bars and passing through recesses in all of said heads, spring locating mechanisms on all of said heads, tie-wire engaging presser rolls associated with said rollers and said locating mechanisms, and a single hand-lever operatively associated with said locating mechanism and presser rolls for moving all thereof to and from active position as said lever is moved in respectively opposite directions, said rollers constituting the sole guiding means for said tie-wires.

14. In a machine of the type specified, a pair of parallel side frame members, cross-bars connecting the same, a series of spring supporting heads carried by and adjustable along said bars to vary their spacing apart, a pair of tie-wire guiding rollers parallel with said bars and passing through recesses in all of said heads, spring locating mechanisms on all of said heads, tie-wire engaging presser rolls associated with said rollers, and said locating mechanisms, manually operable means associated with said heads for shifting springs from one to another position relatively to said rollers along said heads, and a single hand-lever operatively associated with said locating mechanism and presser rolls for moving all thereof to and from active position as said lever is moved in respectively opposite directions, said rollers constituting the sole guiding means for said tie-wires.

15. In a machine of the type specified, a frame including a pair of side members, a plurality of parallel bars connecting said side members, a plurality of rock-shafts journalled in bearings in the latter, a pair of tie-wire guide rollers spanning the space between said side members and disposed parallel with said rock-shafts, a series of spring supporting heads mounted upon and adjustable along said bars to vary their spacing apart, a plurality of idle-roll carriers adjustable along one of said rock-shafts and adapted to be secured against rotation relatively thereto, an idle presser roll on each of said carriers adapted to be disposed for cooperation with said rollers to maintain the latter engaged with a tie-wire, said heads equipped with recesses through which said rollers extend, spring locating means mounted in each of said heads and operatively associated with another of said rock-shafts for simultaneous actuation thereby to engage and disengage pairs of springs supported upon said heads and into and out of the path of said springs, and a single hand-lever associated with said several rock-shafts for throwing said presser rolls out of cooperative relation with said rollers and throwing said locating means out of engagement with and out of the path of travel of said springs.

16. In a machine of the type specified, a frame including a pair of side members, a plurality of parallel bars connecting said side members, a plurality of rock-shafts journalled in bearings in the latter, a pair of tie-wire guide rollers spanning the space between said side members and disposed parallel with said rock-shafts, a series of spring supporting heads mounted upon and adjustable along said bars to vary their spacing apart, a plurality of idle roll carriers adjustable along one of said rock-shafts and adapted to be secured against rotation relatively thereto, an idle presser roll on each of said carriers adapted to be disposed for cooperation with said rollers to maintain the latter engaged with a tie-wire, said heads equipped with recesses through which said rollers extend, spring locating means mounted in each of said heads and operatively associated with another of said rock-shafts for simultaneous actuation, thereby to engage and disengage pairs of springs supported upon said heads, and into and out of the path of said springs, a rotatable shaft journalled in bearings in said side members and said heads, a lever for effecting limited rotation of said shaft, devices on the latter for engaging and advancing coupled springs along said heads, and a single hand lever associated with said several rock-shafts for throwing said presser rolls out of cooperative relation with said rollers and throwing said locating means out of engagement with and out of the path of travel of said springs.

17. In a machine of the type specified, a frame including a pair of side members, a plurality of parallel bars connecting said side members, a plurality of rock-shafts journalled in bearings in the latter, a pair of tie-wire guide rollers spanning the space between said side members, and disposed parallel with said rock-shafts, a series of spring supporting heads mounted upon and adjustable along said bars to vary their spacing apart, a plurality of idle-roll carriers adjustable along one of said rock-shafts and adapted to be secured against rotation relatively thereto, an idle presser roll on each of said carriers adapted to be disposed for cooperation with said rollers to maintain the latter engaged with a tie-wire, said heads equipped with recesses through which said rollers extend, spring locating means mounted in each of said heads and operatively associated with another of said rock-shafts for simultaneous actuation thereby to engage and disengage pairs of springs supported upon said heads and to move the same into and out of the path of said springs, a rotatable shaft journalled in bearings in said side members and said heads, a lever for effecting limited rotation of said shaft, star wheels mounted on said shaft between said heads and in engaging relation to tie-wires coupling the springs for effecting advancement of rows of coupled springs from one position toward another and supporting the same in the advanced position, and a single hand lever associated with said several rock-shafts for throwing said presser rolls out of cooperative relation with said rollers and throwing said locating means out of engagement with and out of the path of travel of said springs.

18. In a machine of the type specified, the combination with tie-wire guide rollers and means for advancing tie-wires along the same, of spring locating and positioning means disposed in cooperating relation to said rollers to support overlapped spring portions in position to be encircled by said tie-wire as the latter is advanced along said rollers, and guide bars extending transversely of said rollers and in overlapping relation thereto for causing the portions of the springs to be overlapped for encirclement by the tie-wire to become overlapped in a predetermined manner with the plane of said overlap disposed in substantially the axis of the tie-wire.

19. In a machine of the type specified, the combination with rollers for advancing and guiding a tie-wire into encircling relation to overlapped spring portions, of spring locating mechanisms for engaging said overlapped spring portions each at three spaced apart points in the arcuate portion of each spring overlapping an arcuate portion of a companion spring, two of said points of engagement of each spring being substantially at the crossing points of said overlapped portions and the third point being substantially equally spaced from said crossing points.

20. In a machine of the type specified, a pair of tie-wire guide rollers each equipped with tie-wire engaging annular grooves spaced apart a distance equal to the length of a coil of the tie wire, said rollers each equipped also with annular grooves disposed in staggered relation to said first-named grooves and also spaced apart a distance equal to the length of a coil of the tie wire with said last-named grooves of one of said rollers disposed in opposed relation to the similar grooves of the other thereof for the reception of spring locating pins, a series of spaced apart upholstery-spring engaging heads associated with said rollers and adjustable along the same to vary their spacing apart, retractable spring locating pins associated with said respective heads, and means operable to effect movement of said pins through the last-named annular grooves of said rollers into and out of engaging relation to pairs of upholstery springs engaged with said heads.

21. In a machine of the type specified, a pair of tie wire guide rollers each equipped with tie wire engaging annular grooves spaced apart a distance equal to the length of a coil of the tie wire, said rollers each equipped also with annular grooves disposed in staggered relation to said first-named grooves and also spaced apart a distance equal to the length of a coil of the tie wire with said last-named grooves of one of said rollers disposed in opposed relation to the similar grooves of the other thereof for the reception of spring locating pins, a series of spaced apart upholstery-spring engaging heads associated with said rollers and adjustable along the same to vary their spacing apart, retractable spring locating pins associated with said respective heads, and means operable to effect movement of said pins through the last-named annular grooves of said rollers into and out of engaging relation to pairs of upholstery springs engaged with said heads, said pins serving also to limit the adjustment of said heads relatively to each other along said rolls to a distance each equal to the length of one or more coils of said tie-wire.

22. In a machine of the type specified, a pair of tie-wire guide rollers each equipped with tie-wire engaging annular grooves spaced apart a distance equal to the length of a coil of the tie wire, said rollers each equipped also with annular grooves disposed in staggered relation to said first-named grooves and also spaced apart a distance equal to the length of a coil of the tie wire with said last-named grooves of one of said rollers disposed in opposed relation to the similar grooves of the other thereof for the reception of spring locating pins, a series of spaced apart upholstery-spring engaging heads associated with said rollers and adjustable along the same to vary their spacing apart, retractable spring locating pins associated with said respective heads, and means operable to effect simultaneous movement of all of said pins through the last-named annular grooves of said rollers into and out of engaging relation to pairs of upholstery springs engaged with said heads.

23. In a machine of the type specified, a pair of tie-wire guide rollers each equipped with tie-wire engaging annular grooves spaced apart a distance equal to the length of a coil of the tie wire, said rollers each equipped also with annular grooves disposed in staggered relation to said first-named grooves and also spaced apart a distance equal to the length of a coil of the tie wire with said last-named grooves of one of said rollers disposed in opposed relation to the similar grooves of the other thereof for the reception of spring locating pins, a series of spaced apart upholstery-spring engaging heads associated with said rollers and adjustable along the same to vary their spacing apart, retractable spring locating pins associated with said respective heads, and means operable to effect simultaneous movement of all of said pins through the last-named annular grooves of said rollers into and out of engaging relation to pairs of upholstery springs engaged with said heads, said pins serving also to limit the adjustment of said heads relatively to each other along said rolls to a distance each equal to the length of one or more coils of said tie-wire.

24. In a machine of the type specified including means for holding a pair of upholstery springs in overlapped relation to each other over a pair of tie wire guide rollers, a locating pin movable through a space between said rollers to project through overlapped portion of said springs, a pair of presser rolls associated with said pin, and means operable to move said pin into and retract it from said last-named position out of the path of said springs and simultaneously therewith cause said presser rolls to move into and retract the same from engaging relation to said tie wire.

25. In a machine of the type specified including means for holding a pair of upholstery springs in overlapped relation to each other over a pair of tie wire guide rollers, a locating pin movable through a space between said rollers to project through overlapped portion of said springs, a pair of presser rolls associated with said pin, and means operable to move said pin into and retract it from said last-named position out of the path of said springs and simultaneously therewith cause said presser rolls to move into and retract the same from engaging relation to said tie wire, through the terminal coils of said springs on opposite sides of the overlapping portions of the latter.

26. In a machine of the type specified, a pair of tie-wire guide rollers, a series of presser rolls for cooperation with said rollers to maintain a tie wire engaged with the latter carriers for said presser rolls a series of spring locating pins on said carriers, means for maintaining pairs of springs partially overlapped upon the rollers, mechanism operable to reciprocate said carriers to cause said pins to project between said rollers and through the overlapped spring portions and to cause said presser rolls to project through the springs and over the rollers preparatory to advancing a tie wire along the latter into encircling relation to the overlapped spring portions, said carriers including devices for pressing the overlapped spring portions against pins, the latter and said rolls being disposed out of the path of said springs and tie-wire when said carrier is moved back to its initial position.

27. In a machine of the kind specified, the combination with a pair of tie-wire guide rollers and means for maintaining pairs of springs disposed in partially overlapped position over said rollers, of a series of reciprocable carriers disposed opposite said rollers, locating pins mounted on the carrier and adapted to be projected between said rollers through the overlapped spring portions, pairs of devices pivotally connected with said carriers, a presser roll carried by each of said devices, means on each of said devices for engaging the springs to hold the overlapped portions thereof engaged with said springs when said presser rolls and pins are in one position relatively to said rollers, said carriers operable to move said pins and presser rolls into said last-named position and into retracted inoperative position, and springs mounted upon said devices for yieldingly maintaining said presser rolls in engaging relation to a tie-wire.

28. In a machine of the kind specified, the combination with rollers for driving and guiding a helical tie-wire into encircling relation to overlapped spring portions, of mechanism for maintaining pairs of springs in predetermined overlapped position for encirclement by the tie-wire, presser rolls normally disposed out of the path of the overlapped spring portions and out of engaging relation to the tie-wire, and means operable to project said presser rolls through the said springs into engaging relation to the tie wire over the overlapped portions of said springs.

29. In a machine of the kind specified, the combination with rollers for driving and guiding a helical tie-wire into encircling relation to overlapped spring portions of mechanism including presser rolls for engaging the tie wire at points over the overlapped spring portions and means directly associated with said rolls for bringing and retaining the overlapped spring portions in a predetermined position over said rollers within the zone of action of said presser rolls; and means for moving said mechanism into and out of operative relation to the said rollers.

30. In a machine of the kind specified, the combination with rollers for driving and guiding a helical tie-wire into encircling relation to overlapped spring portions of carriages equipped with devices for moving and maintaining the springs into predetermined overlapped relation over the said rollers and with presser rolls for engaging the tie wire over the said overlapped spring portions; and means for moving said carriages simultaneously into and out of position wherein said devices and rolls are operative.

31. In a machine of the kind specified, the combination with rollers for driving and guiding a helical tie-wire into encircling relation to overlapped spring portions of reciprocable carriages disposed opposite the side of the rollers from that opposed to the overlapped spring portions, locating pins rigid with said carriages and adapted to be projected between the axes of the rollers through the space defined by the overlapped spring portions, carriers for and presser rolls thereon associated with said carriages movable to project through the portions of the springs at opposite sides of the overlapped portions thereof to position said rolls in engaging relation to the tie wire over said rollers and said overlapped spring portions, and devices on said carriers adapted to engage and force overlapped spring portions against said locating pins.

32. In a machine of the type specified, the combination with a pair of opposed parallel sets of spaced apart heads between which two rows of upholstery springs are adapted to be received and engaged, of pairs of parallel grooves tie-wire guide rollers extending over the entire width of the machine, and through recesses in the opposed faces of said heads with their circumferences disposed substantially tangential with the respective faces of the said sets of heads, sets of manually operable retractable device mounted upon said heads and movable to engage the terminal coils of springs of two rows and move and hold the same in overlapped relation to each other over said rollers while engaged with opposed faces of the said heads and in the path of the tie wires advanced along said respective pairs of rollers, said devices being operable simultaneously to disengage them from the springs and move them to retracted positions to permit advancement of the two rows of springs to a second position.

33. In a machine of the type specified, the combination with a pair of opposed parallel sets of spaced apart heads between which two rows of upholstery springs are adapted to be received and engaged, of pairs of parallel grooved tie-wire guide rollers extending over the entire width of the machine, and through recesses in the opposed faces of said heads with their circumferences disposed substantially tangential with the respective faces of said sets of heads, mounted upon said heads and movable to engage the terminal coils of springs of two rows and move and hold the same in overlapped relation to each other over said rollers while engaged with opposed faces of said heads and in the path of the tie wires advanced along said respective pairs of rollers, said devices being operable simultaneously to disengage them from the springs and move them to retracted positions to permit advancement of the two rows of springs to a second position.

FRED R. ZIMMERMAN.
RUDOLPH WM. LOTZ.